US011673689B2

(12) United States Patent
X et al.

(10) Patent No.: US 11,673,689 B2
(45) Date of Patent: Jun. 13, 2023

(54) COMMAND CENTER FOR DRONE MANAGEMENT

(71) Applicant: Verizon Patent and Licensing Inc., Basking Ridge, NJ (US)

(72) Inventors: X, Portland, OR (US); David A. Newell, Justin, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 135 days.

(21) Appl. No.: 17/241,326

(22) Filed: Apr. 27, 2021

(65) Prior Publication Data
US 2022/0340300 A1   Oct. 27, 2022

(51) Int. Cl.
*B64F 1/36* (2017.01)
*B64F 1/22* (2006.01)
*B64C 39/04* (2006.01)
*B65G 1/137* (2006.01)
*B64U 10/13* (2023.01)
*B64U 80/86* (2023.01)

(52) U.S. Cl.
CPC ............... *B64F 1/36* (2013.01); *B64C 39/04* (2013.01); *B64F 1/222* (2013.01); *B65G 1/1371* (2013.01); *B64U 10/13* (2023.01); *B64U 80/86* (2023.01); *B64U 2201/00* (2023.01)

(58) Field of Classification Search
CPC . B64F 1/36; B64F 1/222; B64C 39/04; B64C 2201/027; B64C 2201/14; B64C 2201/208; B65G 1/1371
See application file for complete search history.

(56) References Cited

U.S. PATENT DOCUMENTS

| | | | |
|---|---|---|---|
| 10,099,561 B1 * | 10/2018 | Ananthanarayanan et al. | B60L 53/32 |
| 10,809,745 B2 * | 10/2020 | Ruth | G06Q 10/00 |
| 11,194,348 B2 * | 12/2021 | Maor | A01G 25/16 |
| 2016/0185466 A1 * | 6/2016 | Dreano, Jr. | G06Q 10/083 705/26.81 |
| 2016/0244187 A1 * | 8/2016 | Byers | B64D 1/00 |
| 2018/0089622 A1 * | 3/2018 | Burch, V | B64F 1/222 |
| 2020/0003529 A1 * | 1/2020 | Benezra | B64C 39/028 |
| 2020/0361634 A1 * | 11/2020 | Gil | G06T 7/001 |
| 2021/0065560 A1 * | 3/2021 | Ali | G07C 5/008 |

FOREIGN PATENT DOCUMENTS

| | | | | |
|---|---|---|---|---|
| WO | WO-2017178898 A2 * | 10/2017 | | B25J 19/0066 |
| WO | WO-2018169695 A1 * | 9/2018 | | B60L 53/80 |
| WO | WO-2020049604 A1 * | 3/2020 | | B64C 27/20 |
| WO | WO-2020056309 A1 * | 3/2020 | | B64C 39/024 |
| WO | WO-2020104568 A1 * | 5/2020 | | B60P 1/00 |

* cited by examiner

*Primary Examiner* — Assres H Woldemaryam

(57) ABSTRACT

An operations platform includes a structure configured to house and transport drones and a storage facility configured to store the drones within the structure. The operations platform includes a lift or conveyor configured to move the plurality of drones to/from a launching area. In some implementations, the operations platform may also include at least one robotic element configured to move the drones to and from the storage facility.

20 Claims, 17 Drawing Sheets

COMMAND CENTER FOR DRONE MANAGEMENT

BACKGROUND INFORMATION

The use of aerial drones, also referred to as Unmanned Aerial Vehicles (UAVs), is increasing. Drones themselves can be awkward to physically transport and manage due to their irregular shape, sensitive operational components (e.g., propellers, cameras) and potentially bulky size. Accordingly, drones are typically stored in some type of box, transported to a ground based launching area, removed from the box and launched. In order to launch a drone from a particular launching area/pad, a drone pilot or other personnel must manually remove the drone from its box, configure the drone for its mission (for example, install equipment, charge/swap battery power sources, load payloads), carry the drone to an appropriate area for launching, set the drone in the selected area for launching and repeat the process for each drone. When a drone mission is completed, personnel may need to remove equipment, payloads and power sources, and repackage the drone in its box for transport. Such processes are typically very time consuming and prone to configuration errors, damage to drones, injury to personnel and other negative consequences/side effects. If multiple drones are to be launched, the delays involved with these preparatory activities may limit the number of drones that can be launched in a period of time and increase delays associated with launching multiple drones.

Most drones are limited in power supply (and therefore flying range) due to the impact weight has on flight capabilities, and therefore when drones are to be deployed, they are typically transported by a carrier (e.g., ground transportation, air transportation) to the location of deployment. The location of deployment may not have the facilities that are available at typical aircraft operations centers (e.g., airports, helipads, etc.) that may be needed for drone flight operations. For example, the deployment environment may not have level terrain for takeoff/landing operations, fueling capabilities (e.g., recharging, battery swapping, fuel tanks), equipment stores (e.g., replacement parts, mission-specific attachments/equipment), ground transport (e.g., forklifts, tractors, trailers), or air traffic control. In some situations, drone pilots must be within a certain range of airborne drones (e.g., due to regulatory requirements or communications limitations) and therefore may also need to be transported to the deployment location and provided with the support needed by human personnel (e.g., shelter, power sources, etc.).

DETAILED DESCRIPTION OF EXAMPLE EMBODIMENTS

The following detailed description refers to the accompanying drawings. The same reference numbers in different drawings may identify the same or similar elements.

Implementations described herein provide a system and platform for performing aspects of drone operations and management. For example, in one implementation, the system may include a mobile vehicle or trailer that carries a number of drones. The mobile vehicle or trailer may be towed or transported to an area where a number of drones are to be launched, and may act as a mobile operations center to support drone ground and flight operations. In an exemplary implementation, the mobile vehicle may include storage facilities to store drones, as well as systems for fueling drones, equipping and repairing drones, drone launch and landing, and drone flight operations. In some implementations, aspects of drone management, such as drone handling and storage, preflight visual inspection, fueling and drone launching and retrieval may be performed in an automated manner with little to no human intervention. In this manner, drone management and operations associated with drone flights may be simplified, and may allow multiple drones to be managed from a single location that is in an area where drone missions have been requested. This may allow more drones to be launched in a given period of time, resulting in more efficient use of the drones and the personnel associated with managing the drones. It may also allow for a variety of drones with differing payloads or capabilities to be deployed in order to accomplish multiple flight goals simultaneously, to provide multiple perspectives from various drones, or to transport multiple items for delivery to multiple locations.

Figure 1:
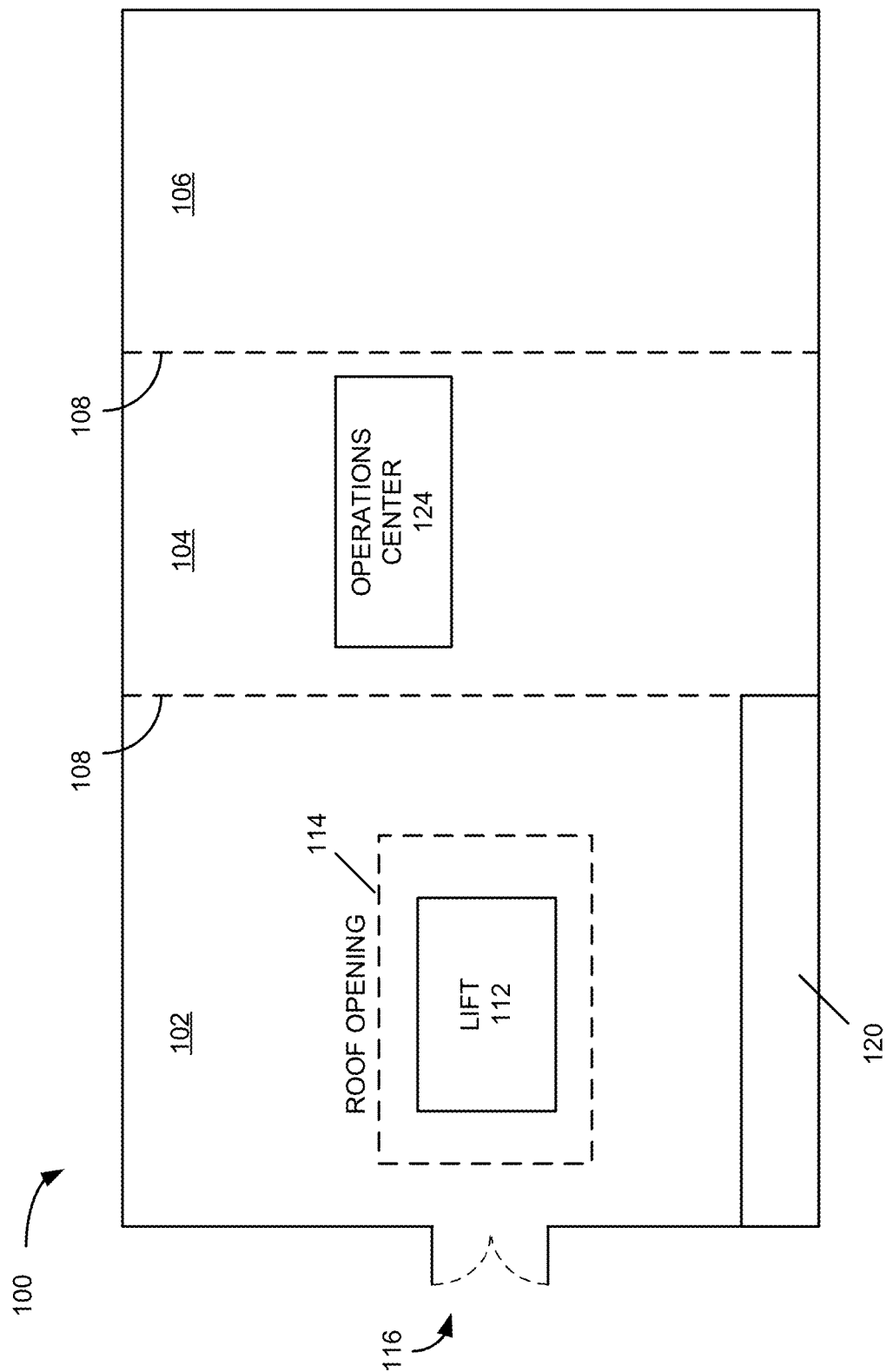
FIG. 1 illustrates a floor plan of an example mobile command center in which systems and methods described herein may be implemented.

FIG. 1 illustrates a floor plan of an example mobile command center 100 in which systems and methods described herein may be implemented. In one implementation, mobile command center 100 may be implemented as a trailer in which drones may be stored prior to and after launch. Referring to FIG. 1, mobile command center 100, also referred to as trailer 100, may include a number of rooms 102, 104 and 106 separated by, for example, movable partitions 108. For example, room 102 may correspond to a work room in which drones are stored. Room 102 may also include a lift 112 on which drones may be placed. Lift 112 may move the drones through an opening or hatch 114 in the roof of trailer 100, as described in detail below. Room 102 may also include a side door or opening 116 via which drones may be transported for launch and/or retrieval. Room 102 may also include a storage facility 120 to store drones.

Room 104 may include an operations center 124 in which personnel may control the operation of drones. Operations center 124 may include processing equipment, displays, communication equipment, etc., that allow personnel to control drone operations in mobile command center 100 locally or remotely from mobile command center 100. Room 106 may include an equipment room which includes servers, communication equipment, mechanical equipment, etc., that aid in the control of drone operations either locally or remotely.

In an exemplary implementation, mobile command center 100 may be transported (e.g., towed) to a location in which drones may be launched. For example, mobile command center 100 may be transported to an area that is appropriate for launching a large number of drones, such as an area that is not near large buildings or other obstructions, is not near a residential or business area and has low foot traffic, etc. However, the area to which mobile command center 100 is transported/towed may be relatively central to areas in which drone operations are needed such that the duration of flights from mobile command center 100 may relatively short to ensure that the drones have the ability to perform the mission and return to mobile command center without requiring recharging or refueling.

Figure 2A:
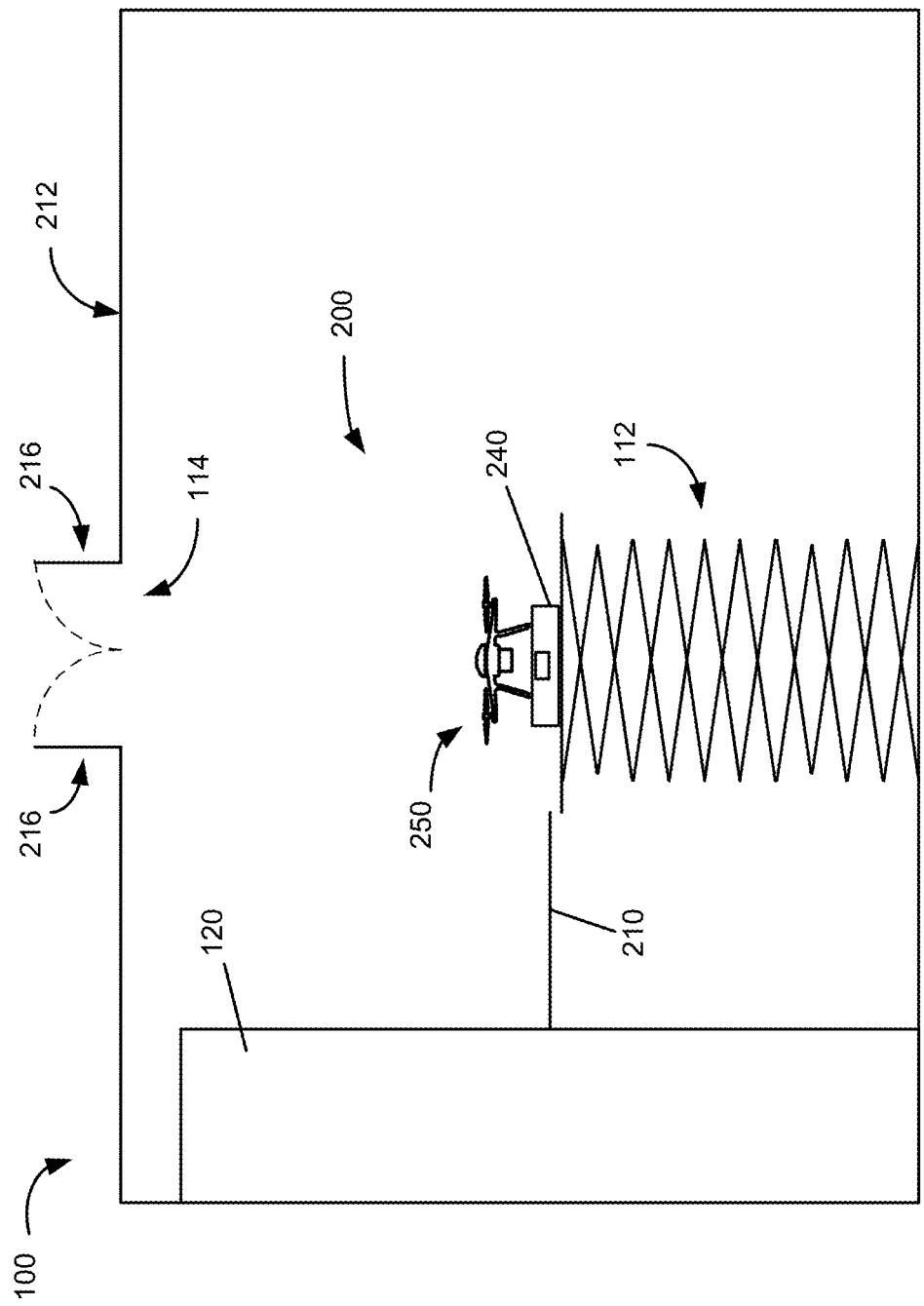
FIGS. 2A and 2B illustrate an example lift used to move a drone to a launching area in accordance with implementations described herein.

In accordance with an exemplary implementation, mobile command center 100 may include a launch system that allows for improved launch/landing capabilities. In some implementations, the launch system may include a scissors-like lift device to transport a drone on a launch platform up through the roof of the mobile command center 100. For example, FIG. 2A illustrates a portion of a launch system 200 included in mobile command center 100. Referring to FIG. 2A, platform 240 may be located on lift 112 and a drone 250 may be located on platform 240. Alternatively, drone 250 may be placed directly on the top surface of lift 112 without the use of platform 240. As illustrated, example lift 112 may be a scissors-like lift that, in the compressed state shown in FIG. 2A, is located within mobile command center 100. Although other types of lifts may be possible implementations for lift 112, a scissor lift has several benefits, such as compactness for use in mobile command center 100, ability to extend through the roof of the mobile command center 100 without needing supporting structures on the roof of the mobile command center 100, relatively simple mechanical design with high tolerance for varying environmental conditions (e.g., heat, cold, humidity). In some implementations, lift 112 may be configured such that the location of the top surface of lift 112 when the lift 112 is in its lowered state is at a height that is adjacent to drone storage facility 120 and/or a height that is ergonomically beneficial for human operators to manipulate the drones 250.

Figure 2B:
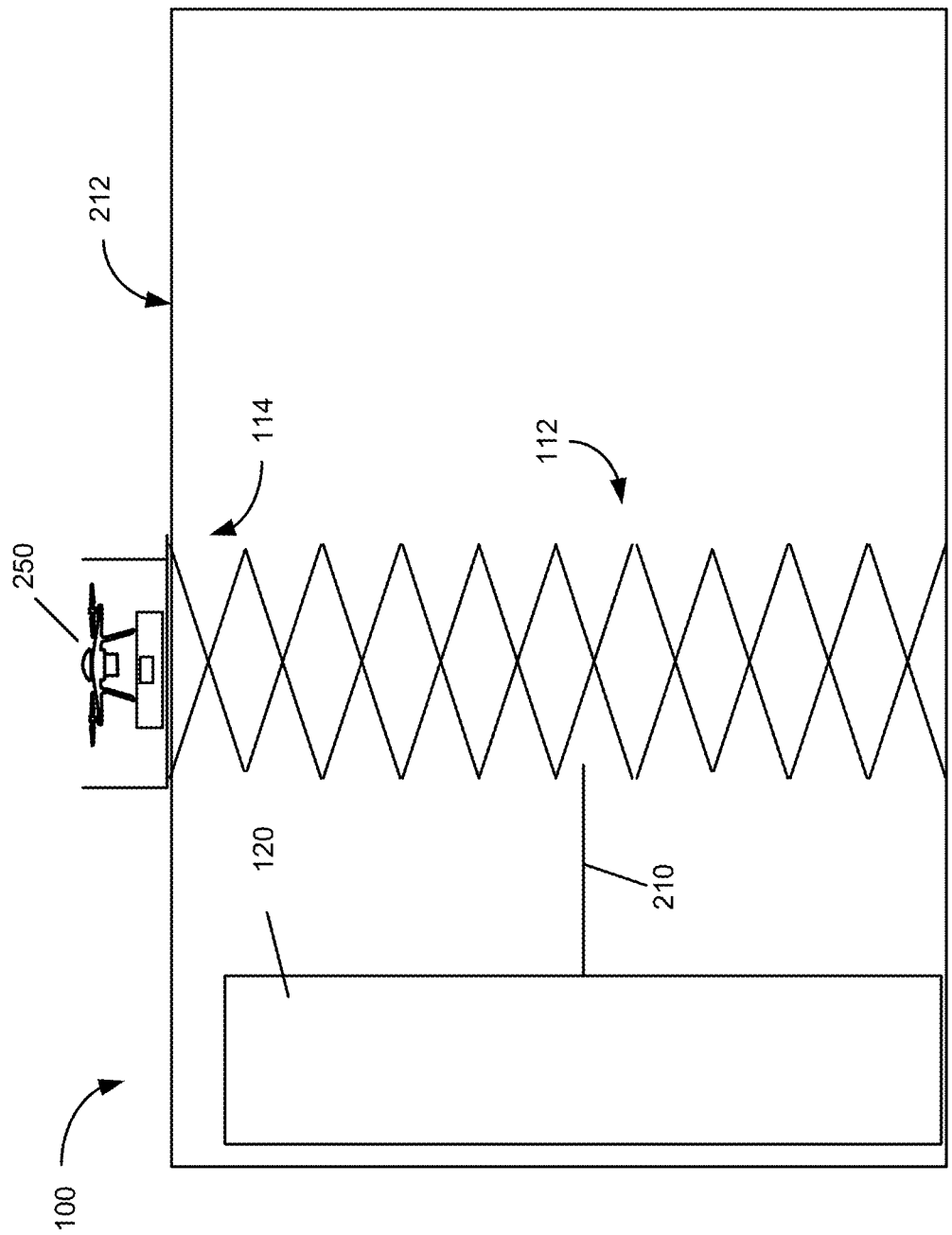

The lift 112 may be controllable (e.g. from operations center 124) such that lift 112 may receive signals that cause the lift 112 to extend and therefore cause lift 112 to rise. Upon receiving an extension signal, lift 112 may begin extension, causing lift 212 and platform 240/drone 250 to move upward toward roof opening 114 in roof 212 of mobile command center 100. Lift 112 may include a drive system to cause extension, such as an electric, pneumatic or hydraulic kinetic drives. FIG. 2B illustrates an example of lift 112 after lift 112 has moved upward to the opening 114 in the roof 212 of mobile command center 100. Once lift 112 has exposed the upper surface of lift 112 to the exterior of mobile command center 100, drone 250 may be cleared to takeoff. In some implementations, a signal may be provided to operations center 124 located in room 104 and/or located remotely from mobile command center 100 when the upper surface of lift 112 and/or platform 240 clears roof 212 from a sensor (e.g. a trip sensor, on optical sensor). In some implementations, a camera may be disposed with a view of roof 212 (e.g., on roof 212) and video images of the position of launch platform 240/drone 250 may be provided to the operations center 124, allowing operators to visualize the status of drone 250 and its readiness for launch.

In the example implementation, roof opening or hatch 114 includes one or more doors which may open and close in order to shield the interior of mobile command center 100 from the outside environment. In some implementations, the one or more doors 216 may operate to open and/or close automatically or may be manually openable when drone operations are commenced. In instances where doors 216 are configured for automatic opening and/or closing, doors 216 may include a control system that causes the opening/closing of doors 216 (e.g., through motors, actuators, and the like). For example, opening 114 and/or lift 112 may include a one or more sensors (e.g. optical sensors, trip sensors, etc.) to determine when launch platform 240 and drone 250 are within a predetermined distance (e.g., 1 foot, 2 feet, etc.) of opening 114, and a signal may be provided to a control system of opening 114 (e.g., doors 216) to cause opening or closing. Additionally or alternatively, the lift 112 may be calibrated such that after performing a certain amount of extension/retraction (e.g., the movement mechanism having been operated for a certain time period), a signal is provided to a control system of doors 216 to indicate that the doors 216 should open/close. Alternatively, when a signal is provided to the lift 112 to extend, a signal may be provided to the doors 216 to open, and when a signal is provided to the lift 112 to retract, a signal may be provided to the doors 216 to close. Additionally or alternatively, a mechanical structure may be disposed on lift 112 such that the structure physically interacts with doors 216 to cause an opening and/or closing.

Figure 3B:
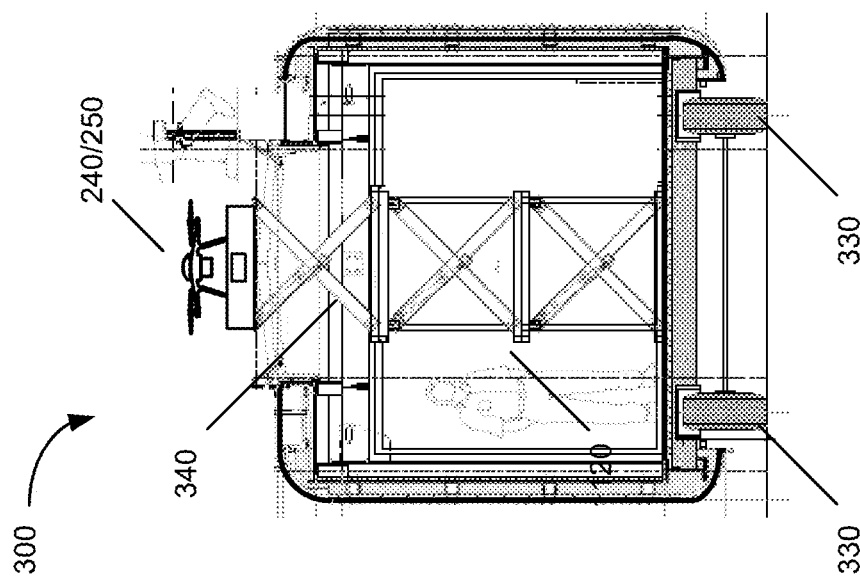
FIGS. 3A and 3B illustrate a mobile command center in accordance with an exemplary implementation.
Figure 3A:
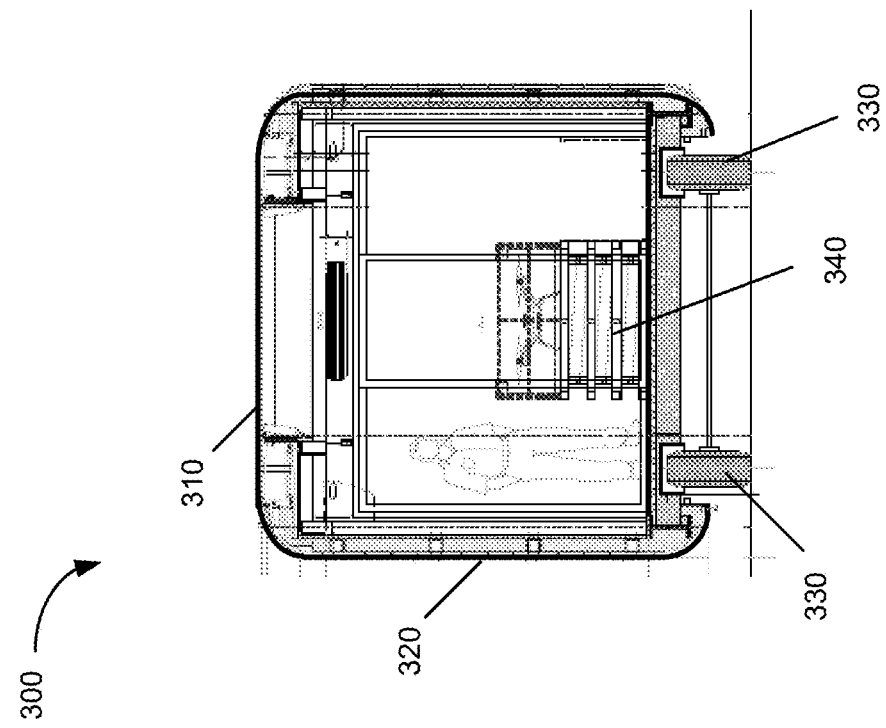

FIG. 3A illustrates a cutaway end view of an example mobile command center 300 (that may correspond to mobile command center 100 described in FIGS. 1, 2A and 2B) illustrating an example deployment and operation of a lift system. Referring to FIG. 3A, mobile command center 300 may be a mobile trailer with a roof 310, sidewalls 320 and wheels 330. Mobile command center 300 may be towed, transported on a tractor trailer, or transported in another manner to a location in which drones 250 may be launched.

As illustrated in FIG. 3A, mobile command center 300 may include lift 340, which may be similar to lift 112 described in FIGS. 2A and 2B. For example, lift 340 may extend through the roof 310 of mobile command center 300 to allow drone 250 to be launched from the roof of mobile command center 300, as illustrated in FIG. 3B. In some implementations, one or more persons may access the roof of mobile command center 300 via a ladder or stairs (not shown) to observe and/or control a launch. In other implementations, one or more persons may be located within mobile command center 300 or located remotely from mobile command center 300 to monitor drone operations.

Figure 4:
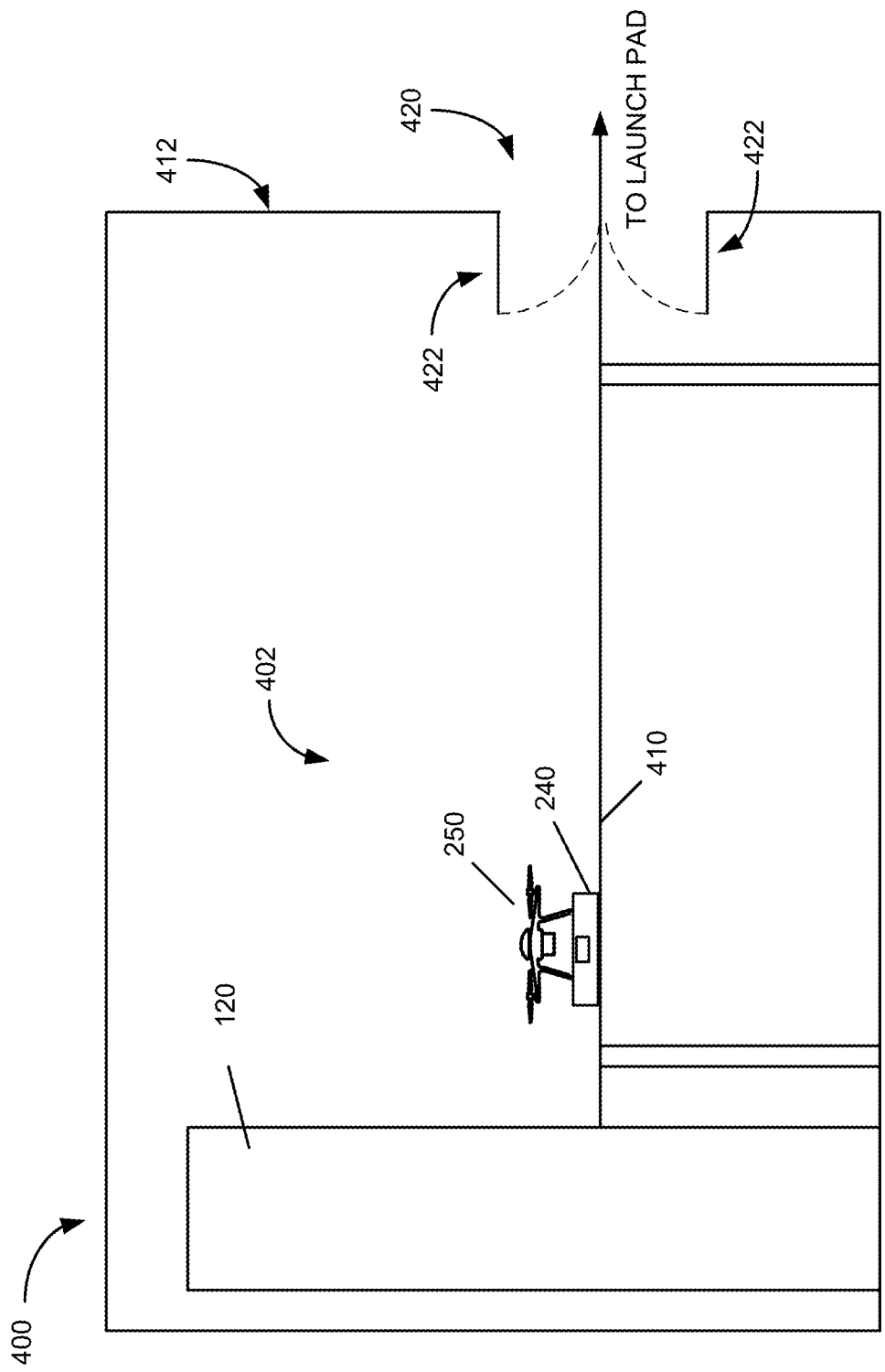
FIG. 4 illustrates a portion of a mobile command center in accordance with an exemplary implementation.

FIG. 4 illustrates another example of a launch system included in a mobile command center 400. Mobile command center 400 may correspond to mobile command center 100 and/or 300 described above). Launch system 402 includes a conveyor 410 that carries a drone 250 along a linear path to a side opening 420 in a sidewall 412 of the mobile command center 400. A side-launching system may have some advantages over a roof launching system, such as allowing human personnel access to the launch platform without needed to climb and walk on a roof, and less potential exposure of the interior of mobile command center 400 to weather. Conveyor 410 may include a launch platform 240 on which a drone 250 may be positioned. Conveyor 410 may be extendable beyond sidewall 412, such that launch platform 240 may be transported to be positioned entirely external to mobile command center 400. Conveyor 410 may be manually extendable (e.g. by personnel sliding or attaching a portion of conveyor 410 to extend beyond sidewall 412) or may be automatically extendable using kinetic drives which may be controllable, for example, by signals provided from operations center 124. When launch platform 240 clears the sidewall 412, drone 250 may be cleared for takeoff, similarly as described above with respect to launch system 200 (e.g., using sensors, video observation, and the like).

In some implementations, side opening 420 may include one or more doors 422 to protect the interior of mobile command center 400 from the exterior environment. Doors 422 may be operable manually or, in some implementations, automatically by control signals, similarly to the operations of doors 216 described above. For example, when a portion of conveyor 410 that is being deployed to be external to sidewall 412 gets within a predetermined distance of opening 420 (which may be detected by sensor, calibration to the amount of movement, or other technique), signals may be provided to a control system for the doors 422 to cause door opening 420 to allow the portion of the conveyor 410 to exit mobile command center 400.

Figure 5:
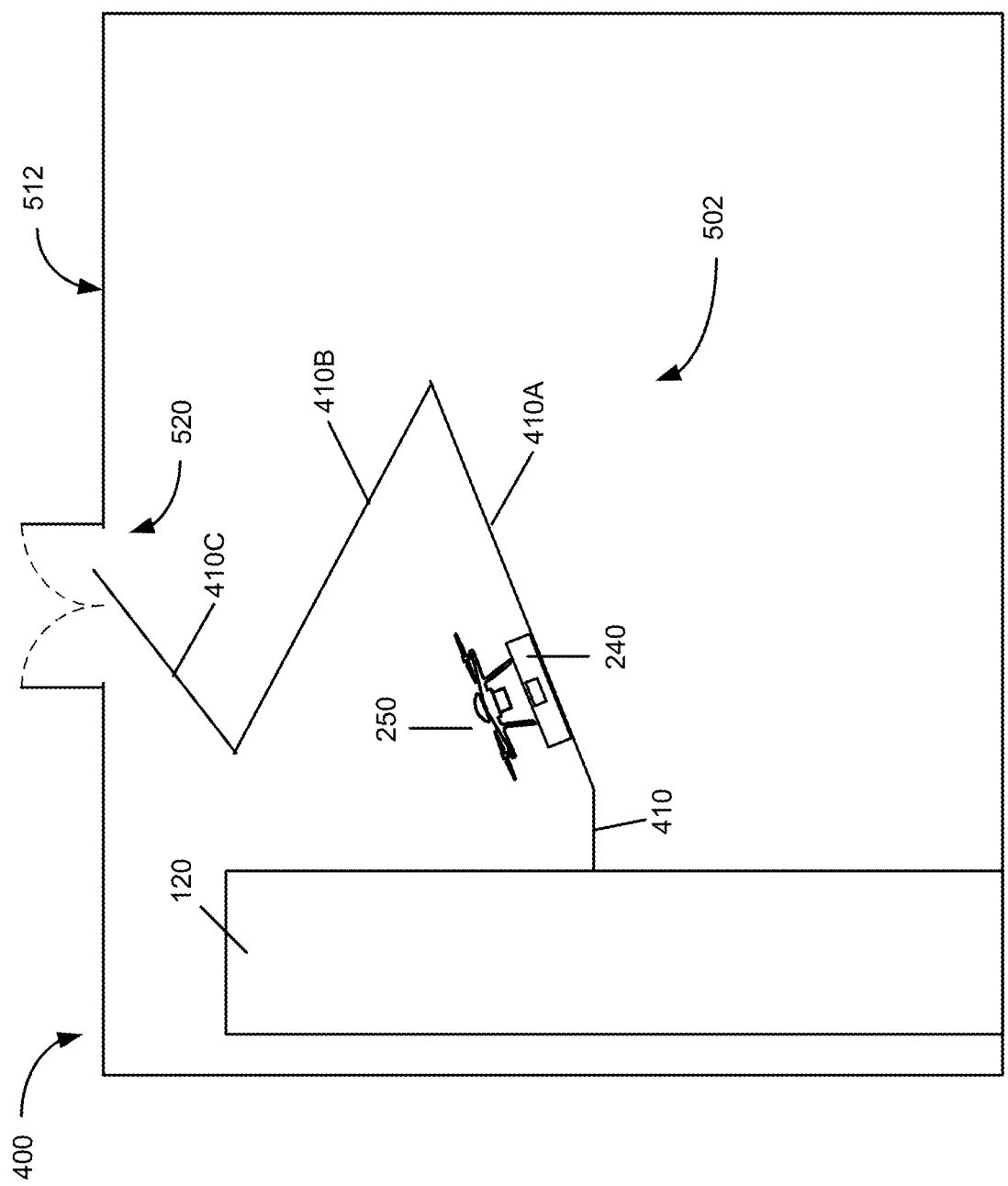
FIG. 5 illustrates a portion of a mobile command center in accordance with another exemplary implementation.

In accordance with still another exemplary implementation, mobile command center 400 may include a conveyor that includes several inclined portions that move drone 250 and platform 240 up through the roof of mobile command center 400 to a launching pad located on the roof. For example, FIG. 5 illustrates a portion of system 502 included in a mobile command center 400. Referring to FIG. 5, drone 250 and platform 240 may located adjacent storage facility 120. A robotic arm (not shown in FIG. 5) may move platform 240 and drone 250 to conveyor 410 and to section 410A. Platform 240/drone 250 may proceed along conveyor 410A toward opening 520 in the roof 512 of the mobile command center 400. As illustrated, conveyor 410 may include portions/sections 410A, 410B and 410C that are inclined with respect to the floor of mobile command center 400. Platform 240 and drone 250 may be placed on conveyor section 410 and move to conveyor section 410A, which is inclined and meets conveyor section 410B which is also inclined and traverses back toward the side of mobile command center 400, and meets conveyor section 410C. Conveyor section 410C may extend through opening 520 in roof 512 of mobile command center 400. In this implementation, conveyor sections 410A-C may be angled such that platforms 240 and drones 250 do not slide down the inclined surfaces. Alternatively, the inclined portions of conveyor 410 may include small extensions, stops or other types of mechanical components extending from the surface of conveyor 410 to allow platforms 240 to abut the extensions or stops to ensure that platforms 240/drones 250 do not slide off or down the inclined conveyor sections 410A-C. In addition, although conveyor sections 410A-C are shown as discrete angled sections, in other implementations, conveyor 410 may include a curved structure which continuously winds or spirals in an upward direction to the opening 520 in the roof 512 of mobile command center 400.

In addition, similar to the discussion above with respect to openings 114 and 420, opening 520 may automatically open when platform 240/drone 250 gets within a predetermined distance of opening 520. For example, opening 520 and/or conveyor section 410C may include a proximity sensor to determine when drone 250/platform 240 is within a predetermined distance (e.g., 10 feet, 20 feet, etc.) of opening 520, which may be detected by a sensor, calibration to the amount of movement of conveyor 410 or another technique, signals may be provided to a control system for doors associated with opening 520 and this may trigger opening 520 to automatically open. In each case, when drone 250 reaches the roof of mobile command center 100, 300 or 400), or extends through the side of mobile command center 100, 300 or 400, a robotic element (not shown in FIG. 5) may move drone 250/platform 240 to the launching pad. Alternatively, drone 250 may be launched directly from platform 240 once platform 240 and drone 250 are outside mobile command center 100/300/400 (e.g., moved through the roof or though the side wall).

Figure 6:
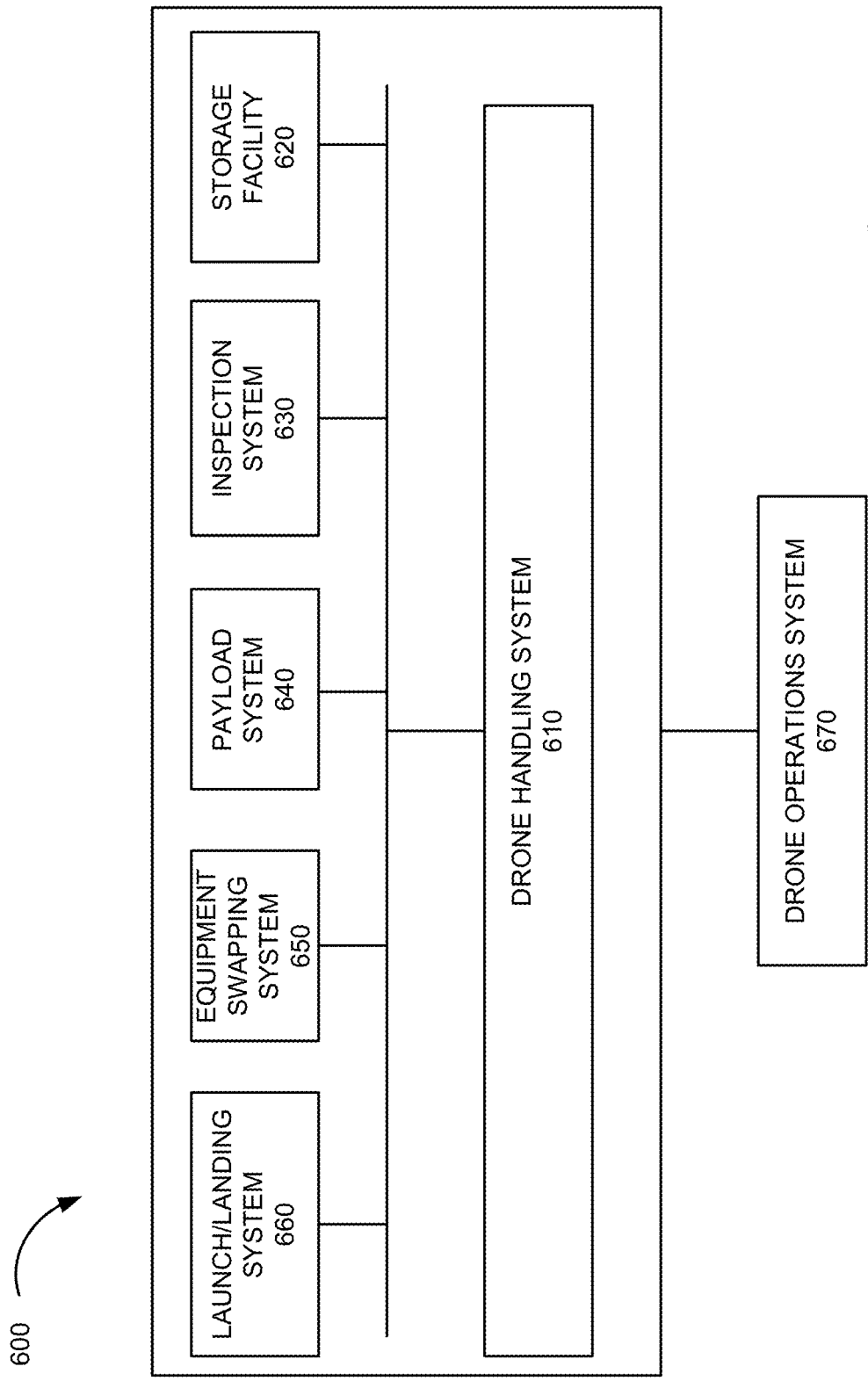
FIG. 6 illustrates an exemplary system in which systems and methods described herein may be implemented.

In some implementations, the mobile command center 100, 300 or 400 may include a drone ground operations system that allows for further improvements to drone management and operations. For example, FIG. 6 is a diagram illustrating an exemplary system in which systems and methods described herein may be implemented. Referring to FIG. 6, system 600 includes drone handling system 610, storage facility 620, inspection system 630, payload system 640, equipment swapping system 650, and launch/landing system 660. A drone operations system 670 may provide control and monitoring of each of the system components through communications with each. It should be understood that system 600 may include other elements based on the implementation. It should also be understood that an implemented system 600 may omit certain of the components of FIG. 6 depending on implementation. For example, in some implementations a system 600 may be implemented without an inspection system 630, payload system 640 and/or equipment swapping system 650, Drone handling system 610 may include mechanical and computing components to move drones (not shown) through system 600, such as from storage facility 620 through inspection system 630, payload system 640, equipment swapping system 650 and to launch/landing system 660. In an exemplary implementation, drone handling system 610 may include one or more robots or robotic components, such as a robotic arm illustrated in FIG. 7A. Drone handling system 610 may further include actuators, sensors and communications circuitry to enable control and monitoring of drone handling system 610, for example, through drone operations system 670.

Figure 7A:
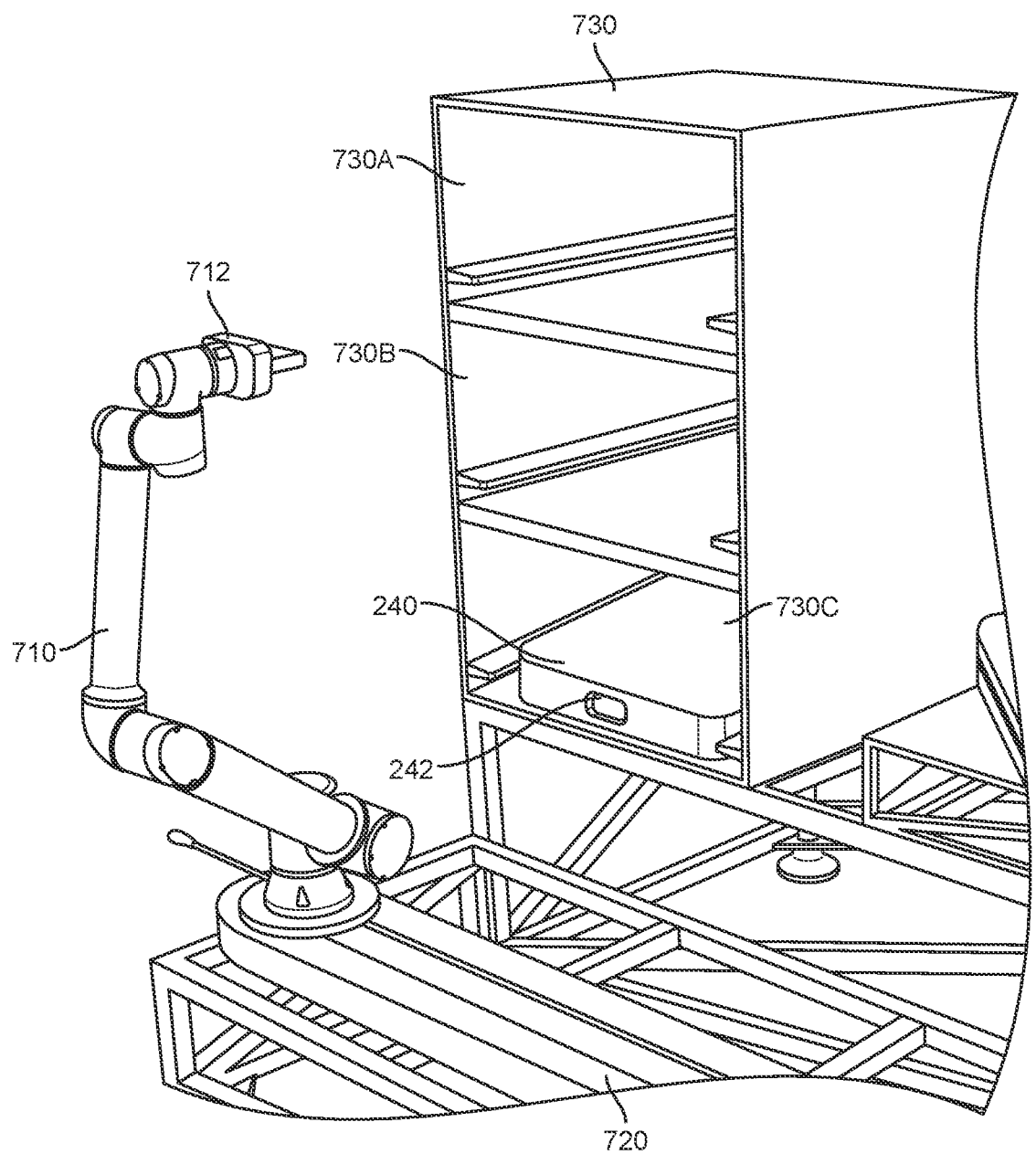
FIGS. 7A and 7B illustrate components implemented in portions of the system of FIG. 6 in accordance with an exemplary implementation.
Figure 7B:
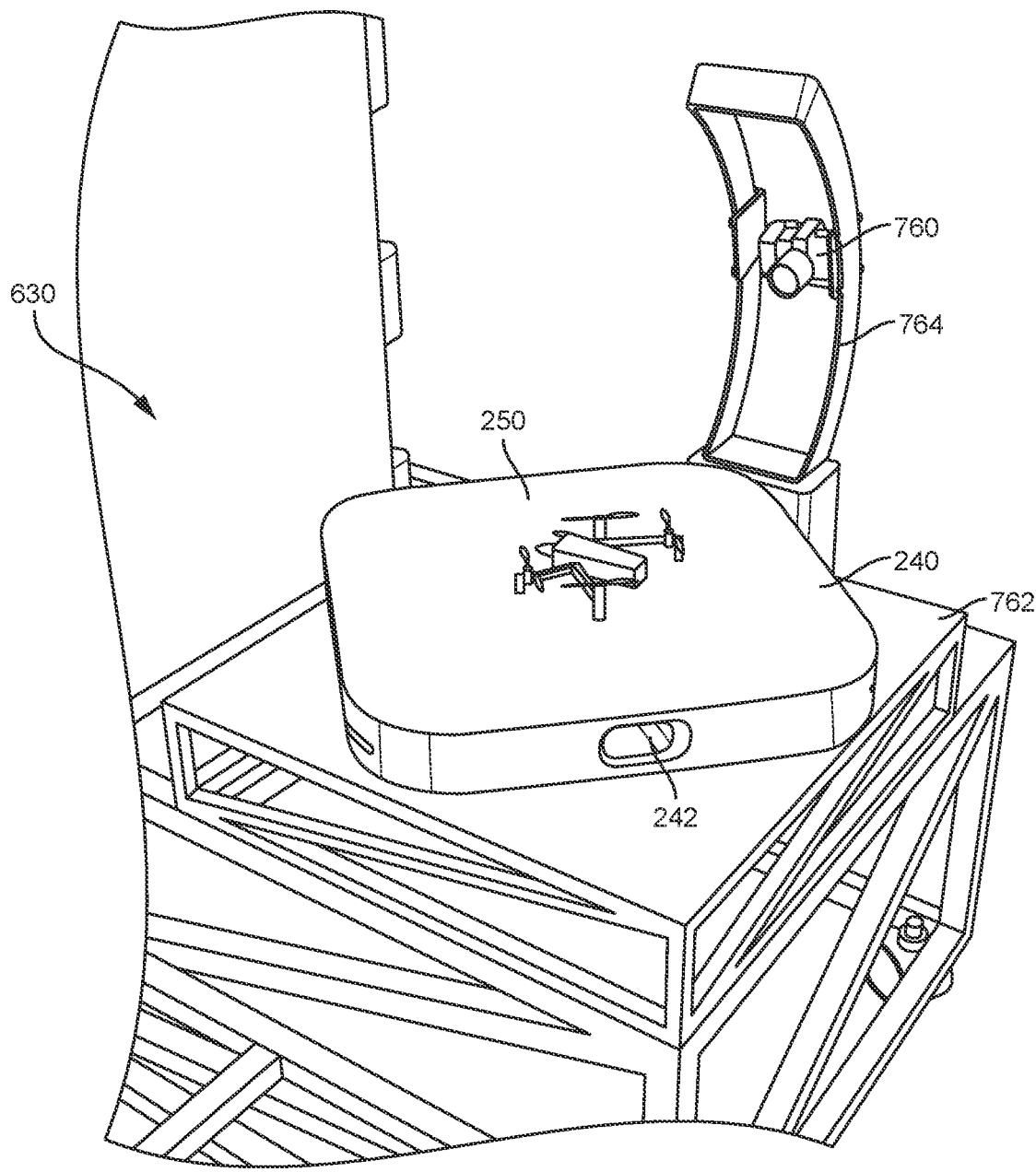

Referring to FIG. 7A, drone handling system 610 may include a robotic arm 710 having control hardware and multiple degrees of articulation to allow the arm to manipulate drones and/or drone carriers (also referred to herein a "platforms"). Robotic arm 710 may include an end 712 with an engagement mechanism that interfaces with drones or drone carriers that may be in a storage facility 620, such as a rack 730 in which drones are stored. In one implementation, drones may be placed on a platform 240 as a drone carrier and stored in rack 730, which may be beneficial to allow accommodation of drones having varying physical configurations. For example, FIG. 7A illustrates a platform 240 with an opening 242 designed to receive the end 712 of robotic arm 710. In this manner, robotic arm 710 may pick up platform 240 (which may be carrying a drone 250, as shown in FIG. 7B) and move platform 240 and drone 250 into and out of storage rack 730, as described in more detail below. In some implementations, platforms 240 may include retention areas, such as indentations, notches, sidewalls or ridges to receive the feet or lower portions of drones 250, to ensure that drones 250 do not slide off platforms 240 while in transit. Platforms 240, the feet of drones 250 and/or the lower portions of drones 250 contacting platforms 240 may also include non-skid surfaces to ensure that drones 250 do not slide off platforms 240 while in transit. Each platform 240 and/or drone 250 may also include identification information, such as an optical code, a radio frequency identifier (RFID) or some other identifier to allow drone handling system 610 (and/or other systems described herein) to track platforms 240 and/or drones 250, such as whether a platform 240 is stored in rack 730, whether platform 240 has been removed from rack 730, whether drone 250 is located at the inspection system 630 or launch/landing system 660, etc. Drone handling system 610 may include sensors that can read such identification information (e.g., optical scanners, RFID tag scanners, and the like). Drone handling system 710 may communicate with drone operations system 670 to communicate the identification information.

Storage facility 620, which may correspond to storage facility 120 described above with respect to FIG. 1, may include a storage system in which drones 250 are stored. For example, as illustrated in FIG. 7A, storage facility 620 may include a storage rack 730 with openings 730A, 730B and 730C that can each store a platform 240 and drone 250 placed on a platform 240. In other implementations, rack 730 may be a large rack including the capacity to store a large number of drones 250.

Figure 8:
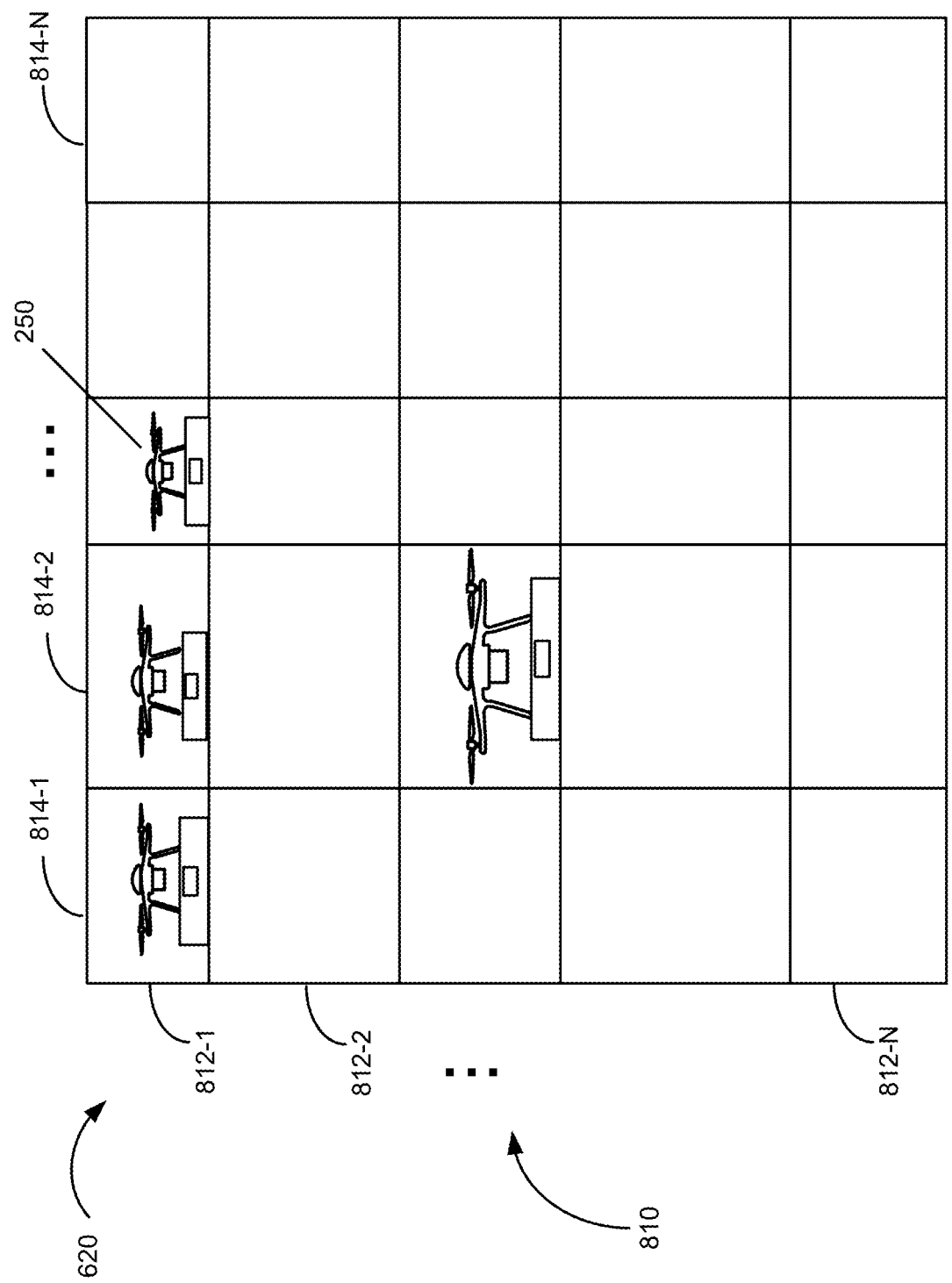
FIG. 8 illustrates an exemplary storage facility in accordance with an exemplary implementation.

As another example, FIG. 8 illustrates storage facility 620 which includes rack 810 with rows (e.g., rows 812-1 through 812-N) and columns 814 (e.g., columns 814-1 through 814-N) of openings to store drones 250 of various sizes. The size of openings in rack 810 may vary depending on the particular implementation. For example, column 814-1 may include relatively small openings with respect to width to store smaller drones 250, while column 814-2 may include larger openings to store larger drones 250. In some implementations, rack 810 may be adjustable such that the size of the openings may be adjusted with respect to both width and height as necessary based on the size of the particular drones 250 or drone platforms 240 being stored.

In some implementations, storage facility 620 may also include elements to add fuel to the fuel storage of drones 250 and/or recharge electric drones 250 that include batteries while drones 250 are stored. In an exemplary implementation, storage compartments of storage facility 620 may include a wireless (e.g., inductive) charging system which allows batteries within drones 250 to be wirelessly charged while drones are stored. In an exemplary implementation, storage facility 620 and/or drone handling system 610 may identify each drone 250 stored in storage facility 620 via, for example, an optical code, a radio frequency identifier (RFID) or some other identifier, and use the identifier to determine the charging and/or fueling requirements associated with that particular drone 250. Storage facility 620 may then be able to provide the appropriate charging and/or fueling for each drone 250. In other implementations, storage facility 620 may include interfaces, conduits and/or cables, such as a universal serial bus (USB) charging ports and cables or compressed gas hoses, to which drones 250 are connected while being stored to allow drones 250 to be fueled and/or charged while in storage. In each case, storage facility 620 may allow drones 250 to be fully fueled/charged while being stored and/or prior to being stored.

In some implementations, storage facility 620 may include a monitoring system that allows for the detection of the contents of storage facility 620. For example, the monitoring system may include optical sensors (e.g., cameras, LIDAR), RF sensors (e.g., RFID scanners) or other sensors that can detect the presence of a platform 240/drone 250 in a location of storage facility 620. In some implementations, a machine vision facility may apply machine vision techniques to images from a camera system to identify one or more of: whether a location of the storage facility 620 is occupied or empty; a type of drone 250 that is occupying a location of storage facility 620, an identity of a drone 250 that is occupying a location of storage facility 620. Storage facility 620 may communicate with drone operations system 670 to provide storage information (e.g., location occupancy status, drone identifiers, etc.) from the monitoring system.

In some implementations of drone handling system 610, robotic arm 710 may be attached to a base portion that integrates with a track 720 (FIG. 7A), such that the robotic arm 710 may be controlled to move laterally along track 720. Such lateral movement may allow robotic arm 710 to access larger storage facilities 620, and may also allow robotic arm 710 to transport drones 250 and/or drone platforms 240 among locations proximate to the track 720. Such locations may be associated with, for example, inspection system 630, payload system 640, equipment swapping system 650, and/or launch/landing system 660. In some implementations, robotic arm 710 may be attached to a fixed location, but a conveyance system may be included in drone handling system 610, such that robotic arm 710 may place a drone 250 or drone carrier 240 onto the conveyance system to enable transport to other locations. Such other locations may have robotic arms similar to robotic arm 710 which may move a drone or drone carrier between the conveyance system and the system(s) being engaged.

Inspection system 630 may include one or more mechanical and computing devices, as well as one or more sensor devices, to perform pre-flight and post-flight inspections of drone 250. For example, referring to FIG. 7B, inspection system 630 may include a surface 762 on which platform 240 may be placed, and one or more cameras 760 mounted on one or more supports 764 to allow cameras 760 to produce video data (e.g., images) of drone 250. In one implementation, a camera 760 and support 764 may rotate around surface 762 and camera 760 may elevate along a vertical portion of support 764 to provide a 360° field of view of drone 250. Although only one camera 760 is shown in FIG. 7B, in other implementations, inspection system 630 may include several cameras or a pan, tilt, zoom (PTZ) configuration to provide a 360° field of view of drone 250. Inspection system 630 may also incorporate other sensing devices, such as microphones, chemical sensors, vibration sensors, radio frequency antennas and detectors, and probing devices that may incorporate such sensing devices. Sensing devices (such as camera 760) are communicatively coupled to processing components to transmit sensor data (e.g., images) for reporting/processing.

Figure 9:
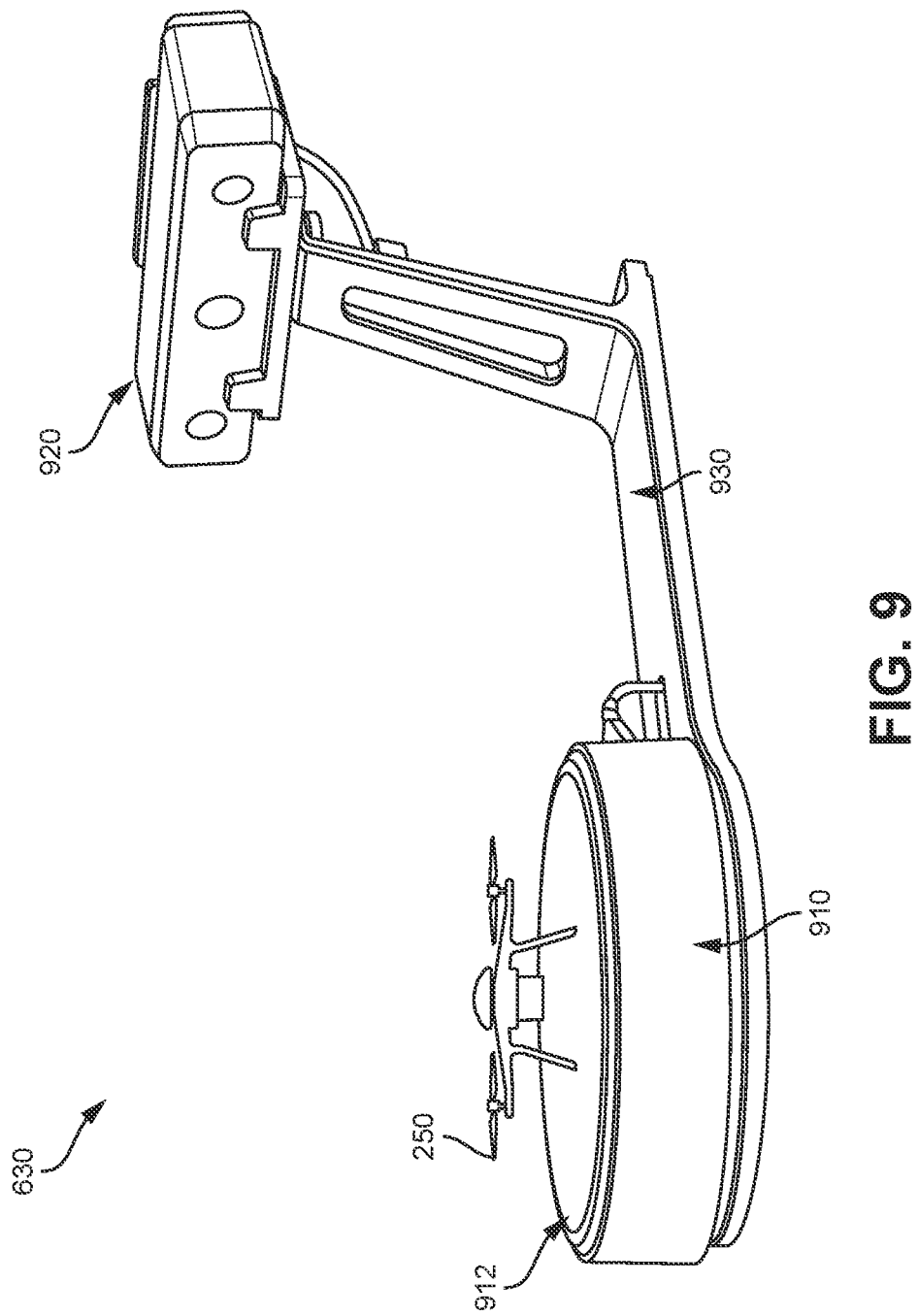
FIG. 9 illustrates an exemplary inspection system in accordance with an exemplary implementation.

FIG. 9 illustrates another example inspection system 630 that includes a base 910 with an upper surface 912 on which a drone 250 may be placed. This example inspection system 630 also includes a camera 920 (e.g., a high definition camera) mounted on a support 930. Base 910 may include a motor to allow base 910 to rotate and provide camera 920 with a 360° field of view of drone 250.

Inspection system 630 may also include or be connected to a controller or processor that executes inspection procedures to determine if drone 250 is fit for flying. For example, inspection system 630 may use computer vision techniques to process data from sensor devices (e.g., images from cameras 760, 920). Inspection system 630 may also execute machine learning techniques to determine if drone 250 is fit for flying. For example, based on a training set of images associated with flight-worthy drones 250 (which may be continuously updated over time with new models, configurations, etc.), and images received from inspection system 630, drone inspection system 630 may determine whether drone 250 is within the tolerances set for any variations from past acceptable visual inspections, and is therefore fit for flying. For example, inspection system 630 may determine that one of the propellers on drone 250 is not at a correct angle with respect to the body of drone 250, that one of the propellers is damaged, etc. Detection of an unfit drone 250 may trigger a notification to an operations center (e.g., drone operations system 670), a return of the drone 250 to the storage facility 620, a selection of a different drone 250 for use in a mission, or all of these actions. Inspection system 630 may also be used to ensure that drone 250 is the desired model of drone for a selected mission, for example, by using the identifier associated with drone 250 to determine if the images received from cameras correspond to expected visuals of the model associated with the identifier.

In some implementations, inspection system 630 may be implemented in multiple locations, and the sensor devices deployed to observe drone 250 may transmit collected data to a remotely located system, such as drone operations system 670, that executes computer vision and/or machine learning algorithms to determine whether drone 250 is in condition for flying. In some implementations, inspection system 630 may transmit sensor data (e.g., images) to operations center displays, such that personnel may observe a selected drone 250 and determine whether it is in condition for flying Payload system 640 may include one or more computer devices, processors and/or controllers to identify the appropriate payload for a drone 250. For example, in one implementation, payload system 640 may identify a payload that is scheduled for transport, and then identify a drone 250 to carry the payload. For example, payload system 640 may access information from storage facility 620 (or drone operations system 670) to identify a drone 250 of the proper capabilities to carry the payload. In one implementation, payload system 640 may use an identifier associated with a particular drone 250 to access records that identifies the size and/or payload carrying capability of drone 250, access a database storing payloads to be carried and schedules associated with the payloads, and select an appropriate drone 250 based on the particular payload and schedule. In some implementations, payload system 640 causes the payload to be delivered to the launch/landing system 660 according to the schedule, so that it can be added to the drone prior to launch.

Equipment swapping system 650 may include one or more mechanical and computing devices (e.g., processors, controllers and/or robotic arms) to change the equipment deployed on drones 250. For example, if inspection system 630 determines that drone 250 is missing a piece of equipment needed for a mission, the drone handling system 610 may be instructed to transport drone 250 to equipment swapping system 650 which is then instructed to install the needed equipment on drone 250. As another example, if inspection system 630 determines that a particular propeller is damaged or if drone 250 allows different sized propellers to be used for flights and drone 250 is being used for a longer distance/larger payload flight than a previous flight, equipment swapping system 650 may change the propeller. In some embodiments, equipment swapping system 650 may include a robotic arm to perform the needed equipment adjustments to drone 250. In other implementations, equipment swapping system 650 may signal robotic arm 710 to move drone 250 to a maintenance area to allow maintenance personnel to make the equipment adjustments.

Launch/landing system 660 may include components to allow drone 250 to be automatically transported to a launching area. For example, launch/landing system 660 may include a conveyor on which platforms 240 and drones 250 may be transported to a launching area. In some implementations, drone handling system 610 may position platform 240 and drone 250 into the launching area. Launch/landing system 660 may include sensors (e.g., optical sensors, trip sensors) that can detect when a drone 250 has entered the launching area, and provide signals (for example, to the drone operations system 670) indicating the drone 250 is ready for launch. In an exemplary implementation, after a launch of a drone 250, launch/landing system 660 may return the platform 240 that was used to carry drone 250 back to storage facility 620 via the conveyor and drone handling system 610. When launch/landing system 660 is informed (for example, from drone operations system 670) that a drone 250 is incoming for landing, launch/landing system 660 may cause a platform 240 to be positioned in the landing area. When the drone 250 lands, launch/landing system 660 may then transport platform 240 back to drone handling system 610 for return to storage facility 620. In some implementations, launch/landing system 660 may also include one or more robotic arms, which may be used to, for example, retrieve a drone from drone handling system 610, place a drone 250 into a launching area, retrieve a drone 250 that has landed in the launching area, place a drone 250 on a platform 240, and provide the platform 240 with the drone 250 to drone handling system 610 for transport to storage facility 620, as described in more detail below.

Drone operations system 670 may include one or more mechanical and computing devices (e.g., processors, controllers) that allow for communications with the various components of system 600, execution of command operations for such components and observation of information received from such components. Drone operations system 670 may use communications systems such as industrial networks (e.g., Ethernet/IP, Common Industrial Protocol, Modbus, etc.) to communicate with other components of system 600. Drone operations system 670 may include (or be in communication with) a data store that stores mission information for scheduled drone missions, as well as a data store of drone information associated with drones stored in storage facility 620, and one or more data stores that may store information received from other system components, such as storage facility 620, inspection system 630, payload system 640, equipment swapping system 650 and launch/landing system 660. Drone operations system 670 may execute operations to perform one or more of: determine assignments of drones in storage facility 620 to scheduled missions, instruct retrieval of a drone 250 for a mission, instruct inspection of a drone 250, instruct equipment swapping for a drone 250, instruct retrieval of a payload, instruct a launch of a drone 250, instruct a landing of a drone 250, instruct storage of a drone 250, and other operations as described above and further below. In some implementations, drone operations system 670 will include an operations center with user interface devices (e.g., displays, input devices) for use by drone operators, and will include facilities to generate user interfaces to show on such devices and/or receive inputs from operators.

Figure 10:
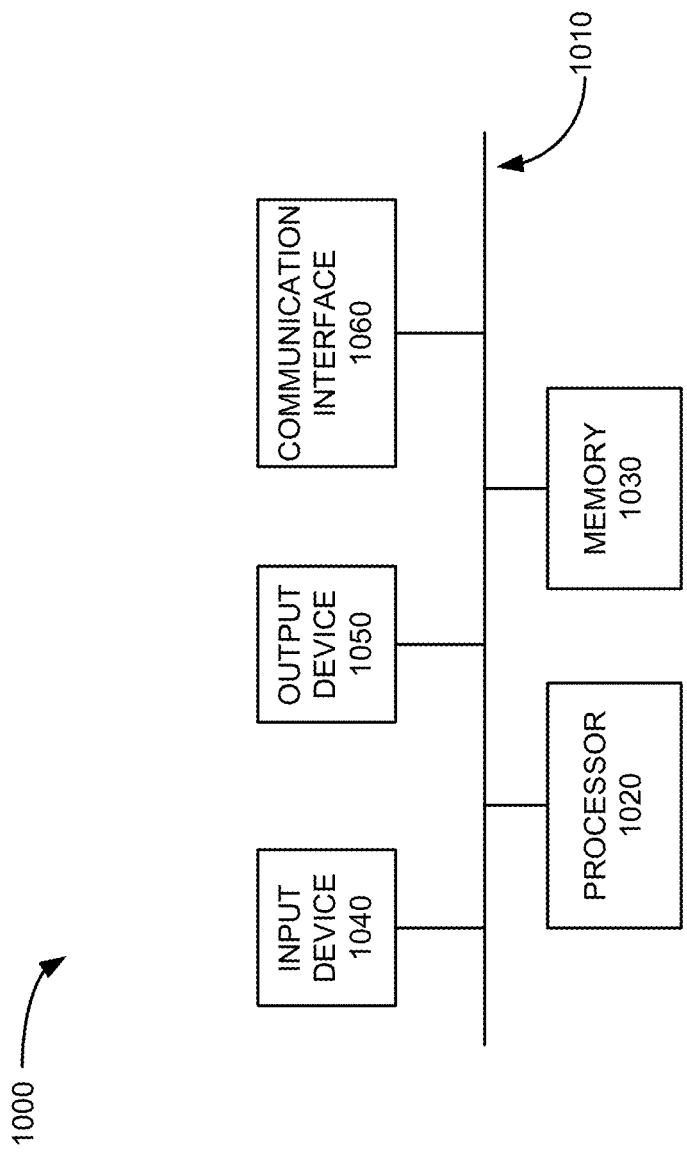
FIG. 10 is a diagram illustrating exemplary components of a device that may correspond to one or more of the devices and/or systems described herein.

FIG. 10 is a diagram illustrating exemplary components of a device 1000 that may correspond to one or more of the systems described herein. For example, device 1000 may correspond to components included in drone handling system 610, storage facility 620, inspection system 630, payload system 640, equipment swapping system 650, launch/landing system 660, drone operations system 670 and/or other elements illustrated in FIGS. 1-9 and/or are used in connection with drone management. For example, device 1000 may include a device located remotely from system 600, such as a device included in an operations center associated with remotely managing drones 250.

Referring to FIG. 10, device 1000 may include bus 1010, processor 1020, memory 1030, input device 5240, output device 1050 and communication interface 1060. Bus 1010 may include a path that permits communication among the elements of device 1000

Processor 1020 may include one or more processors, microprocessors, or processing logic that may interpret and execute instructions. Memory 1030 may include a random access memory (RAM) or another type of dynamic storage device that may store information and instructions for execution by processor 1020. Memory 1030 may also include a read only memory (ROM) device or another type of static storage device that may store static information and instructions for use by processor 1020. Memory 1030 may further include a solid state drive (SSD). Memory 1030 may also include a magnetic and/or optical recording medium (e.g., a hard disk) and its corresponding drive.

Input device 1040 may include a mechanism that permits a user to input information, such as a keypad, a keyboard, a mouse, a pen, a microphone, a touch screen, voice recognition and/or biometric mechanisms, etc. Output device 1050 may include a mechanism that outputs information to the user, including a display (e.g., a liquid crystal display (LCD)), a speaker, etc. In some implementations, device 1000 may include a touch screen display may act as both an input device 1040 and an output device 1050.

Communication interface 1060 may include one or more transceivers that device 1000 uses to communicate with other devices via wired, wireless or optical mechanisms. For example, communication interface 1060 may include one or more radio frequency (RF) transmitters, receivers and/or transceivers and one or more antennas for transmitting and receiving RF data. Communication interface 1060 may also include a modem or an Ethernet interface to a LAN or other mechanisms for communicating with elements in a network.

The exemplary configuration illustrated in FIG. 10 is provided for simplicity. It should be understood that device 1000 may include more or fewer devices than illustrated in FIG. 10. In an exemplary implementation, device 1000 performs operations in response to processor 1020 executing sequences of instructions contained in a computer-readable medium, such as memory 1030. A computer-readable medium may be defined as a physical or logical memory device. The software instructions may be read into memory 1030 from another computer-readable medium (e.g., a hard disk drive (HDD), SSD, etc.), or from another device via communication interface 1060. Alternatively, hard-wired circuitry may be used in place of or in combination with software instructions to implement processes consistent with the implementations described herein. Thus, implementations described herein are not limited to any specific combination of hardware circuitry and software.

Figure 11:
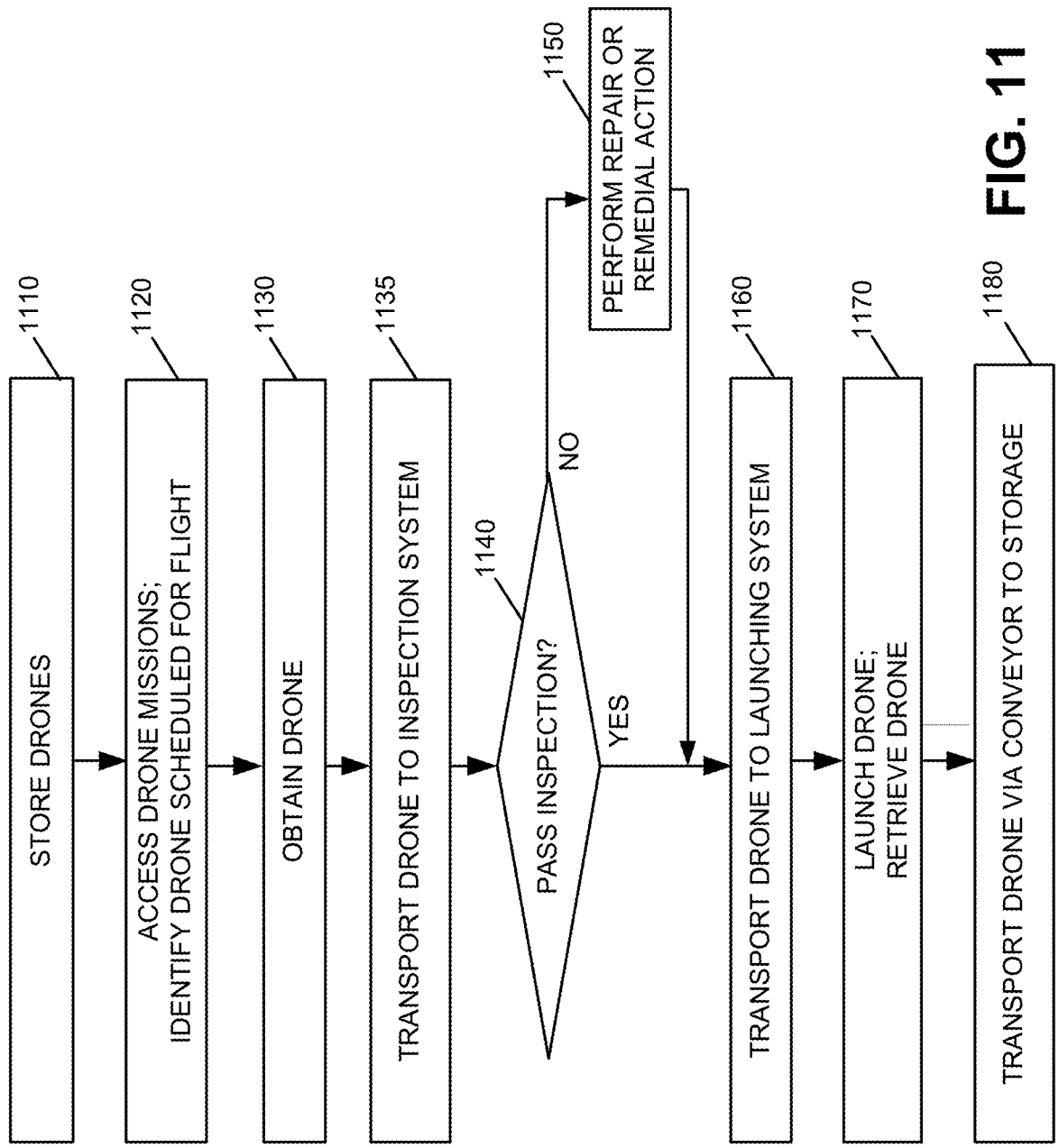
FIG. 11 is a flow diagram illustrating processing associated with drone management in accordance with an exemplary implementation.

FIG. 11 is a flow diagram illustrating processing associated with elements of system 600 to provide drone management in accordance with an exemplary implementation. Processing may begin with storing drones 250 in storage facility 620 (block 1110). For example, storage facility 620 may include one or more storage systems, such as rack 730 or rack 810. As described above with respect to FIGS. 7A and 8, storage facility 620 may include a relatively small rack 730 configured to store a relatively small number of drones (e.g., less than 10), or a large rack 810 configured to store a large number of drones (e.g., 20, 50, 100, or more). Racks 730 and/or 810 may also be capable of storing drones 250 of various sizes.

Once drones 250 are stored, drone handling system 610 and/or storage facility 620 may store information identifying which storage spaces are storing drones 250, the particular drone 250 stored in each storage space, which storage spaces are empty, etc. For example, as noted above, drone handling system 610 may use detection equipment (e.g., optical scanners, RF transceivers) to detect and store information identifying the particular identifier, model and/or size of drones 250 stored in storage facility 620, and/or storage facility 620 may include detection equipment (e.g. cameras, RF transceivers) to detect and store information about occupancy status of storage locations in storage facility 620 and drones 250 stored in storage facility 620. In some implementations, a fueling and/or recharging operation may be conducted for a stored drone 250 while present in storage facility 620, as described above.

System 600 may then access a database of drone missions to determine if any drone missions are scheduled, and identify a drone for a scheduled mission (block 1120). For example, drone operations system 670, drone handling system 610, or another system may access a database that tracks information associated with scheduled drone missions, such as the date/time, payload information, flight plan, expected duration and the like. The database may be stored locally in drone operations system 670, drone handling system 610, or another portion of system 600, and/or may be stored remotely from system 600. In situations in which the database of flight plans is stored remotely, system 600 (e.g., via drone operations system 670, drone handling system 610, or another system) may retrieve the flight plans via a network (e.g., a wireless network, a wide area network, the Internet, etc.).

Drone operations system 670 may determine that a drone 250 stored in storage facility 620 should be used for a mission based on a drone mission in the database. In some implementations, a specific drone identifier may be included in the mission information, and drone operation system 670 may compare it to drone identifiers for drones 250 stored in storage facility 620 to see if any match exists. In some implementations, an identifier of a drone type/model/class may be included in the mission information, and drone operations system 670 may compare it to drone information for drones stored in storage facility 620 to see if any drones in storage match the type/model/class. In some implementations, drone operations system 670 may compare other mission information (e.g., date/time, payload information, expected duration) with drone information for drones stored in storage facility 620, and determine whether a stored drone 250 has capabilities that make it eligible for the mission. In each case, drone operations system 670 may also determine whether an eligible drone 250 has already been scheduled for a mission, and only select a drone 250 for a mission that is not already "reserved" for another mission. Once a drone 250 is identified for a mission, drone operations system 670 may "reserve" the drone for the mission, for example, by indicating in the drone information its assignment to a mission (e.g. using a mission identifier from the mission database, indicating a date/time of the mission, etc.).

System 600 may periodically determine whether it is time to start mission pre-plight preparations for a mission assigned to a drone 250. The amount of time to allocate to pre-flight preparations may be variable depending on the mission information, or in some implementations it may be a set threshold (e.g., 60 minutes prior to desired launch time). For a drone 250 with a mission determined to be within the pre-flight preparation period, drone operations system 670 may instruct drone handling system 610 to remove the selected drone 250 from storage facility 620, for example, by providing one or more instructions that identify the particular drone 250 with the upcoming flight.

Drone handling system 610 may obtain the drone 250 with the upcoming scheduled flight (block 1130). For example, drone handling system 610 may map the identified drone 250 to a corresponding storage space in, for example, rack 730 or 810 in which the drone 250 is stored (e.g., identifies the particular opening 730A-C in rack 730 or the row 812 and column 814 of rack 810 in which drone 250 is stored). Drone handling system 610 may then provide signals to robotic arm 710 to cause it to articulate to the storage location of the drone 250 to be retrieved. Robotic arm 710 may retrieve the drone 250 from the appropriate location in rack 730/810 using its engagement mechanism. In some implementations, drone handling system 610 may send a signal to drone operations system 670 indicating successful retrieval of drone 250. Once drone 250 is removed from rack 730/810, that location/storage space may be registered by storage facility 620 as being empty.

Figure 12:
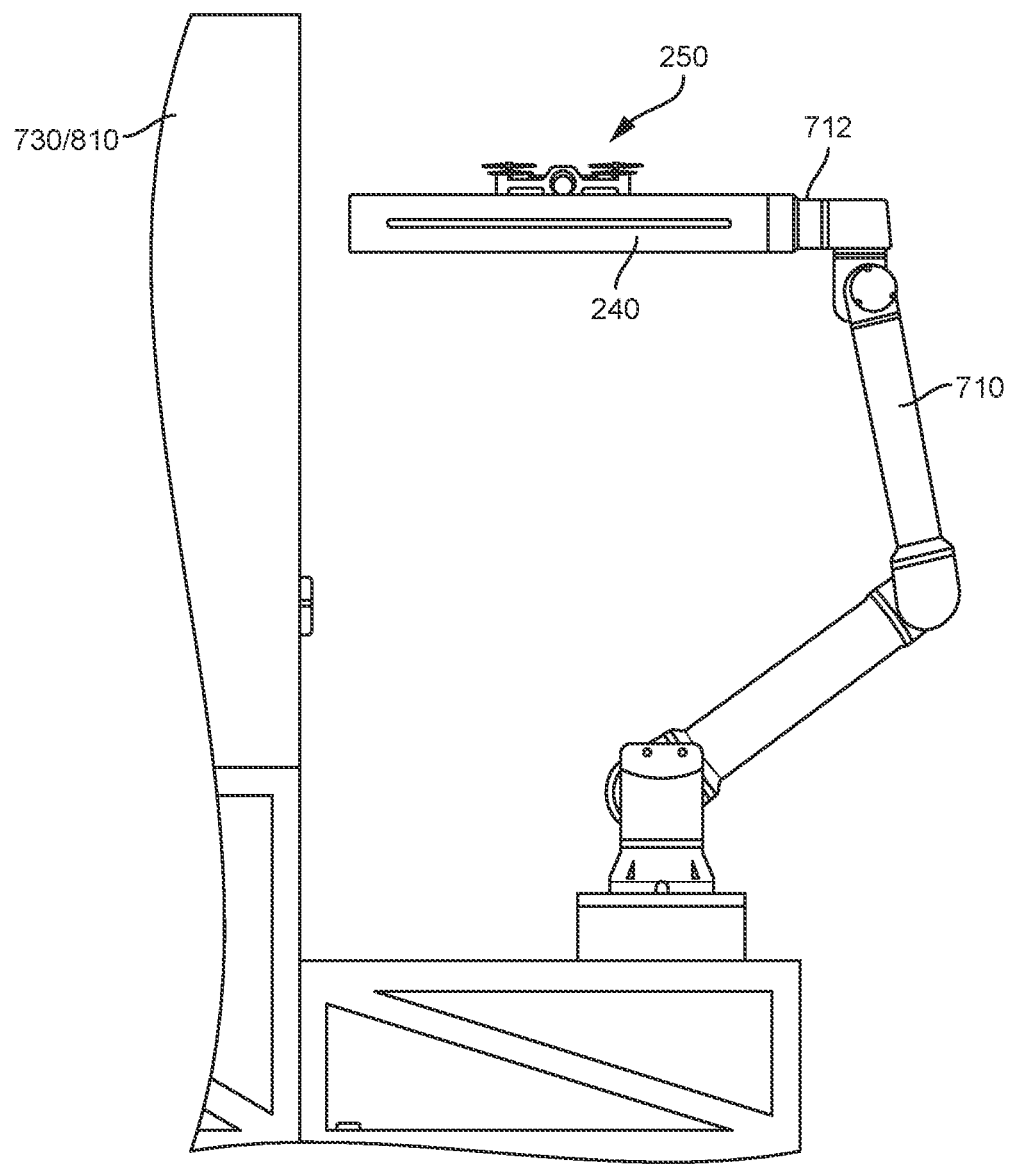
FIG. 12 illustrates components used to move a drone to/from storage associated with the processing of FIG. 11 in accordance with an exemplary implementation.

FIG. 12 illustrates robotic arm 710 retrieving a drone 250. Referring to FIG. 12, robotic arm 710 may be provided signals to cause it to articulate to position its end 712 to a position in storage facility 730/810 corresponding to a platform 240 carrying a drone 250. End 712 may engage with platform 240 and remove platform 240 from its storage location. In embodiments where robotic arm 710 is deployed on track 720 (such as shown in FIG. 7A), robotic arm 710 may be provided signals to move laterally on track 720 as well as articulate in order to engage with the appropriate opening or row/column of rack 730/810 and retrieve platform 240 on which drone 250 rests.

In some implementations, drone operations system 670 may cause the selected drone 250 to be transported to inspection system 630 (block 1135), where the drone 250 may undergo a pre-flight inspection. For example, instructions may be provided to drone handling system 610 to transport the retrieved drone 250 to inspection system 630, and drone handling system 610 may provide signals to robotic arm 710 to cause it to articulate such that platform 240 is positioned into an inspection area of inspection system 630. In implementations where robotic arm 710 is deployed on track 720, signals may be provided to robotic arm 710 to cause it to move along track 720 to a position proximate to inspection system 630 and place the retrieved drone 250/platform 240 in an inspection area of inspection system 630, such as illustrated in FIG. 7B. In some implementations where drone handling system 610 includes a conveyor, such as conveyor 1310 described below, signals may be provided to robotic arm 710 to cause it to place platform 240 on the conveyor for transport to inspection system 630. Inspection system 630 may use its robotic arm to move platform 240 from the conveyor to the inspection area.

Inspection system 630 may then determine whether drone 250 passes the inspection (block 1140). As described above with respect to FIG. 7B, inspection system 630 may include one or more sensor devices, such as camera 760. Once platform 240 with drone 250 are in the inspection area, instructions may be provided to inspection system 630 to have camera 760 start providing images (e.g., video) of drone 250. Inspection system 630 may provide signals to cause the movement of sensors, sensor mounts and/or the inspection area in order to obtain sensing data from different perspectives, such as the positional movement described above with respect to the examples shown in FIGS. 7B and 9. As discussed above, inspection system 630 may use computer vision and/or machine learning techniques to process data received from sensors of inspection system 630 (in the examples, image data from camera 760/920). Inspection system 630 may also determine whether drone 250 is fully charged by, for example, viewing or otherwise obtaining a battery status level indicator on drone 250. In other implementations, inspection system 630 may transmit images of drone 250 received from camera 760/920 to an operations center for display to personnel to determine whether drone 250 is in condition for flying.

If drone 250 does not pass inspection (block 1140—no), drone operations system 670 may take a remedial action (block 1150). For example, in some implementations, drone handling system 610 may be instructed to move platform 240 and drone 250 to equipment swapping system 650 to replace damaged equipment or add missing equipment. In some implementations, drone handling system 610 may be instructed to move platform 240 and drone 250 to a maintenance area to allow personnel to repair the drone 250. In some implementations, drone handling system 610 may be instructed to move drone 250 back to storage facility 620 (for example, if inspection system 630 determines that drone 250 is not adequately fueled or charged for the upcoming flight). In some implementations, drone handling system 610 may be instructed to retrieve another drone 250 from storage facility 620 to use as a replacement drone for the upcoming mission. In some implementations, a notification will be sent to an operations center, such as drone operations system 670, to indicate the inspection failure. In some implementations, a notation will be made in the drone information for the drone that the drone failed inspection, in some cases including information about the failure (e.g., date/time, reason). In some implementations, some or all of the previous remediation actions may be taken by drone operations system 670.

Figure 13:
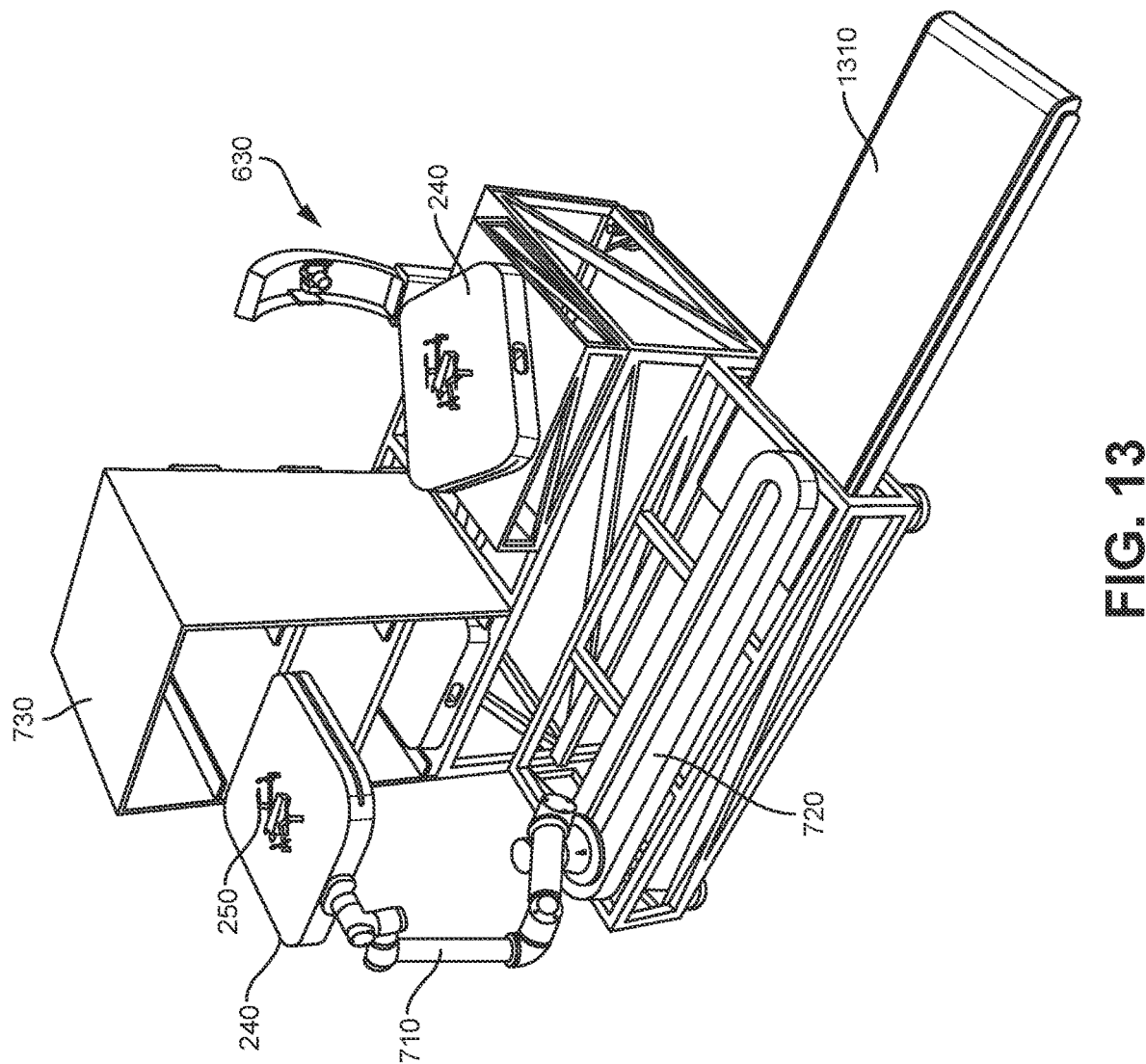
FIG. 13 illustrates components associated with the processing of FIG. 11 in accordance with an exemplary implementation.

If drone 250 passes inspection by inspection system 630 (block 1140—yes), drone handling system 610 may be instructed to transport drone 250 to launch/landing system 660 (block 1160). For example, drone operations system 670 may be notified that drone 250 passes inspection, and may then instruct drone handling system 610 to transport drone 250 to launch/landing system 660. In some implementations, signals may be provided to robotic arm 710 to cause it to articulate to place the platform 240/drone 250 onto a loading area of launch/landing system 660. In implementations where robotic arm 710 is deployed on track 720, signals may be provided to robotic arm 710 to cause it to move along track 720 to a position proximate to launch/landing system 660 and place the platform 240/drone 250 onto a loading area of launch/landing system 660, as illustrated in FIG. 13. In implementations where drone handling system 610 includes a conveyor 1310, robotic arm 710 may place platform 240 on the conveyor 1310 for transport to launch/landing system 660, where its robotic arm may move the platform 240 from the conveyor to the loading area. In some implementations, such as the example depicted in FIG. 13 in which launch/landing system 660 includes conveyer 1310, the loading area may comprise a portion of conveyor 1310. Once the platform 240/drone 250 is placed in the loading area, launch/landing system 660 may be instructed to transport the drone to a launch/landing pad.

Figure 14:
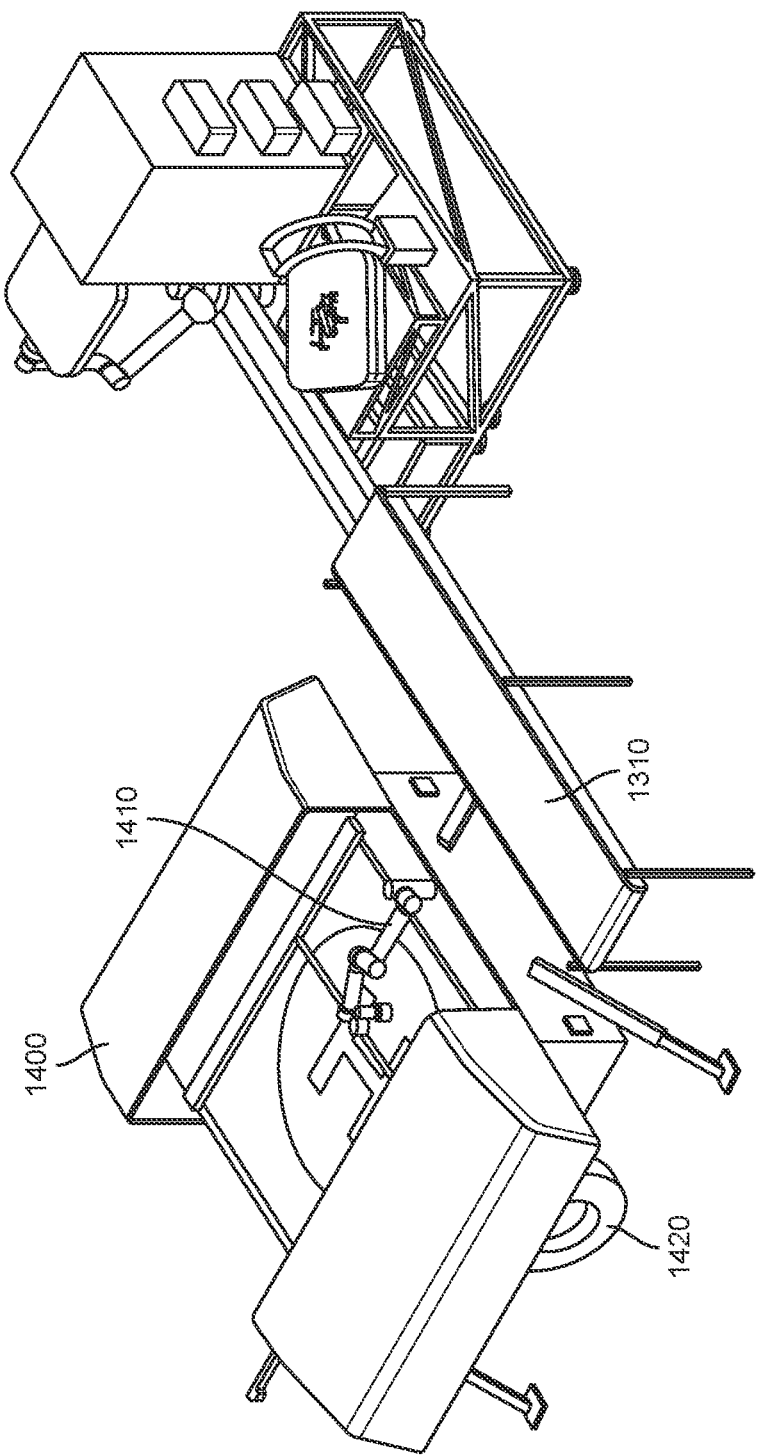
FIG. 14 illustrates components associated with launching a drone associated with the processing of FIG. 11 in accordance with an exemplary implementation.

For example, FIG. 14 illustrates an exemplary conveyor 1310 that extends to launching pad 1400, also referred to as drone pad 1400. Referring to FIG. 14, conveyor 1310 may transport platform 240 with a drone 250 to drone pad 1400. At the end of the conveyor 1310, a robotic arm 1410 may remove the platform 240 from conveyor 1310 and place platform 240 with drone 250 on the drone pad 1400. In some implementations, robotic arm 1410 may remove drone 250 from platform 240 and place drone 250 on drone pad 1400. In some implementations, drone pad 1400 may include a drive mechanism 1420 (e.g., wheels, motors) to facilitate movement of drone pad 1400. For example, after a drone 250 is placed on drone pad 1400, drone pad 1400 may be moved to an area for launching, and then moved back to the location adjacent the end of conveyor 1310 after the launch. Launch/landing system 660 may include cameras or other sensing devices to detect when a drone 250 is positioned in the loading area, when the drone 250 is positioned on the drone pad 1400, when the drone pad 1400 is clear, etc. Sensor information may be sent to the drone operations system 670, for example, to allow operators to determine whether to perform a launch/landing.

In an exemplary implementation, drone operations system 670 (or a system located remotely from system 600 that received information from drone operations system 670) may launch drone 250 at its scheduled time (block 1170). For example, drone operations system 670 may provide instructions to drone 250 to start its propulsion systems and commence flight. Drone operations system 670 may also provide flight instructions and/or control drone 250 while in flight.

In some implementations, launch/landing system 660 may provide signals to robotic arm 710 to retrieve platform 240 after the launch and place platform 240 on conveyor 1310. Conveyor 1310 may be instructed to operate in a reverse direction to return platform 240 to drone handing system 610 so it can be reused. Alternatively, platform 240 may be stored in an area local to launch/landing system 660 so it may be used when drone 250 returns from the mission (or another drone 250 lands on drone pad 1400). In some implementations, launch/landing system 660 may include a staging area where payloads may be attached to drone 250. For example, payload system 640 may cause a payload to be transported to launch/landing system 660 according to the mission information, where it can be loaded onto drone 250 (e.g. manually, by robotic arm, etc.).

After the drone 250 has completed its mission (e.g., dropped off a payload, used a camera to do video imaging, used sensors to make weather/atmospheric measurements, etc.), drone 250 may return to a landing area, such a drone pad 1400. In advance of landing, drone operations system 670 may indicate to launch/landing system 660 that a drone is incoming for landing, and launch/landing system 660 may provide signals to robotic arm 410 to place a platform 240 in position on drone pad 1400 to receive the incoming drone 250. Once drone 250 has landed and been turned off, robotic arm 410 may retrieve the drone 250 (block 1170) and place it on conveyor 1310 for return to storage facility 520 (block 1180). In this manner, drone 250 may be returned to storage facility 620, be recharged and/or refueled and be ready for its next flight.

Figure 15:
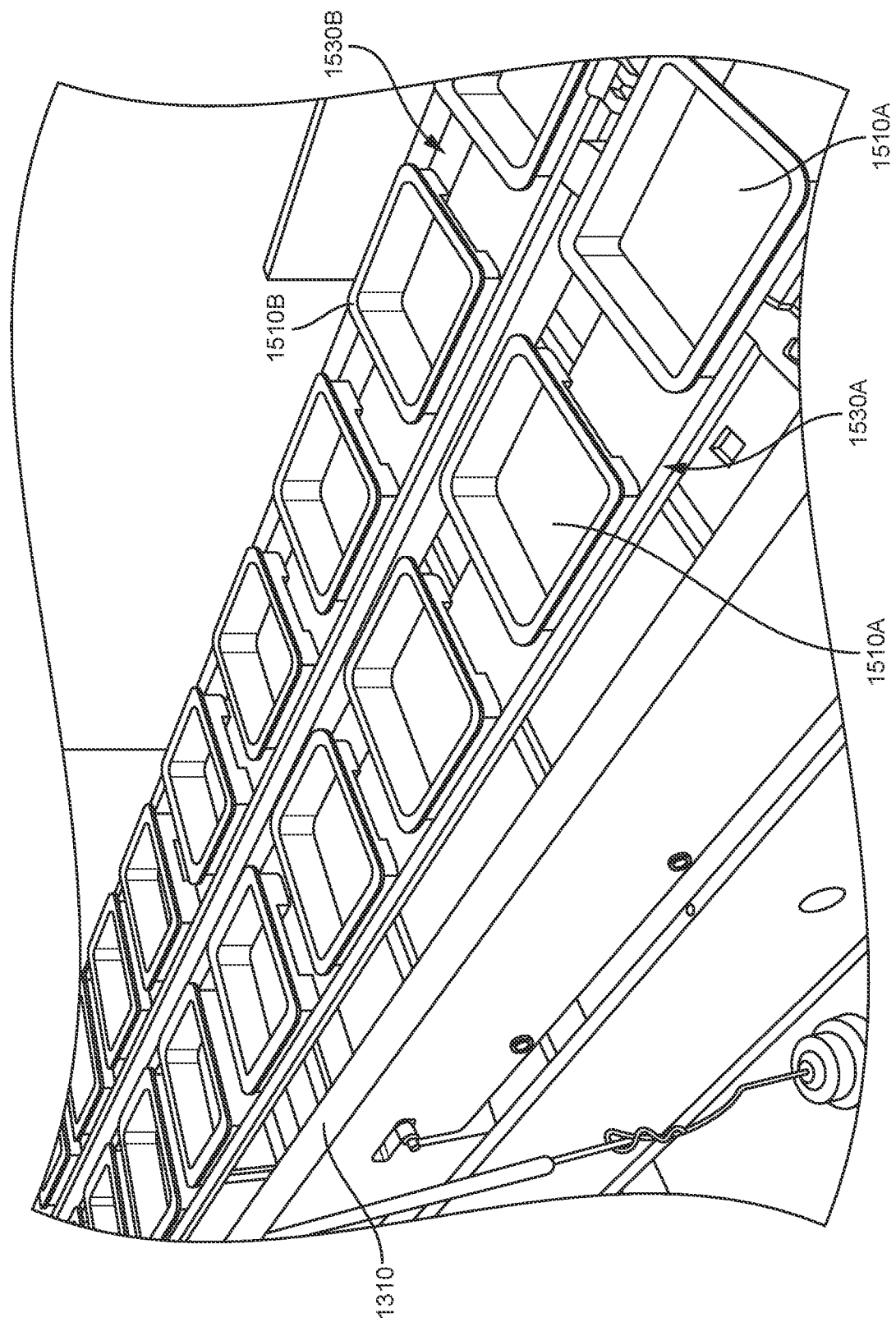
FIG. 15 illustrates a drone transport system in accordance with an exemplary implementation.

In some implementations, conveyors implemented herein (e.g., conveyor 1310) may include one track that can move platforms 240 and/or drones 250 along a first path (such as from storage facility 620 to inspection system 630 and/or to launch/landing system 660) and another track that can move platforms 240 and/or drones 250 from launch/landing system 660 to inspection system 630 and/or storage facility 620. FIG. 15 illustrates an example of such an implementation. Platforms 1510 may be used to transport drones 250, and may be placed on a track 1530A or 1530B of conveyor 1310 depending on a direction of travel. Referring to FIG. 15, track 1530A may transport platforms 1510A (which may contain drones 250) in a direction towards a launching pad (not shown). Track 1530B may transport platforms 1510B in a direction away from launch/landing system 660 and towards storage facility 620. The platforms 1510A and 1510B may be empty (i.e. not holding a drone 250), for example, when a platform is being returned to storage facility 620 after a launch, or when a platform is being sent to the launch/landing system 660 for use with a landing drone.

Further, although not described in detail above, system 600 and mobile command center 100/300/400 may be used in many types of scenarios. For example, system 600 and mobile command center 100/300/400 may be used to manage the delivery of packages, letters by drones 250, used by firefighters or other personnel during an emergency or natural disaster situation to identify, for example, the extent of the fire/natural disaster, used in a search and rescue operations, used to determine weather conditions in a particular geographical area, such as before a hurricane, etc. In each case, system 600 may allow for automated control of a large number of drones 250, and may allow the drones 250 to be controlled remotely from an operations center that may be located far away from system 600. In such scenarios, communications to system 600 may be accomplished via a wireless network.

Implementations described herein provide for a fully automated, or a near fully automated system in which drones 250 can be operated and managed. The system may be provided in a mobile command center so that the drones 250 may be transported to a launching area. The system may also provide for charging, inspection and automated drone launching and retrieval. This may allow a large number of drones 250 to be launched in an efficient manner, resulting in increased flights as well as reduced personnel costs and overall operating costs.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to number of discrete systems, such as a drone handling system 610, storage facility 620, inspection system 640, payload system 640, equipment swapping system 650, launch/landing system 660 and drone operations system 670. In other implementations, these systems may be combined into a single system or with other systems.

In addition, features have been described above with respect to system 600 being automated such that little to no human personnel are required. In some implementations, one or more operating personnel may be located within the mobile command center to oversee and/or perform various tasks associated with drone management, such as performing a propeller swapping, replacing a battery, etc.

Further, while series of acts have been described with respect to FIG. 11, the order of the acts may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. An operations platform, comprising:
a structure configured to house and transport a plurality of drones;
a storage facility configured to store the plurality of drones within the structure;
at least one robotic element configured to move the plurality of drones to and from the storage facility;
an inspection station comprising at least one camera configured to provide a plurality of images or video of a first one of the plurality of drones to be used to determine whether the first drone is approved for a flight; and
at least one of a lift or conveyor configured to move the first drone to a launching area.

2. The operations platform of claim 1, wherein the structure includes a trailer configured to be towed or transported.

3. The operations platform of claim 2, wherein the at least one of the lift or conveyor comprises a lift configured to move the first drone from a first position at a first height above a floor of the trailer to a second position through a roof of the trailer.

4. The operations platform of claim 2, wherein the at least one of the lift or conveyor comprises a conveyor configured to move the first drone from a first position adjacent the storage facility to a second position through a roof or side of the trailer.

5. The operations platform of claim 1, wherein the structure comprises a trailer having a roof and walls,
wherein at least one of the roof or one of the walls includes a door or opening, and
wherein the at least one of the lift or conveyor is configured to transport the plurality of drones through the door or opening to the launching area.

6. The operations platform of claim 5 wherein the door or opening is configured to automatically open in response to a drone being moved to the launching area.

7. The operations platform of claim 1, further comprising:
a drone control system configured to:
access flight plans associated with the plurality of drones, and
signal the at least one robotic element to obtain the first drone based on a scheduled flight.

8. The operations platform of claim 7, wherein the drone control system is further configured to:
identify a payload associated with the scheduled flight, and
signal the at least one robotic element to pair the identified payload with the first drone.

9. The operations platform of claim 1,
wherein the at least one camera comprises a plurality of cameras, wherein prior to a flight for the first drone, the at least one robotic element is configured to move the first drone to the inspection station.

10. The operations platform of claim 1, further comprising:
at least one second robotic element configured to retrieve the plurality of drones after flights.

11. The operations platform of claim 10, wherein the at least one of the lift or conveyor is configured to return the plurality of drones to an area adjacent the storage facility after the flights.

12. The operations platform of claim 1, further comprising:
the plurality of drones.

13. A method, comprising:
storing a plurality of drones in a storage facility within a structure;
moving, via at least one robotic element, a first one of the plurality of drones from the storage facility;
inspecting, prior to a flight and via an inspection station comprising at least one camera, the first drone to determine whether the first drone is approved for the flight; and
moving, via at least one of a lift or conveyor, the first drone to a launching area.

14. The method of claim 13, wherein the structure comprises a trailer, and wherein the moving, via at least one of the lift or conveyor comprises:
moving, via the lift, the first drone from a first position at a first height above a floor of the trailer to a second position through a roof of the trailer.

15. The method of claim 13, wherein the structure comprises a trailer, and wherein the moving, via at least one of the lift or conveyor comprises:
moving, via the conveyor, the first drone from a first position adjacent the storage facility to a second position through a roof or side of the trailer.

16. The method of claim 13, wherein the structure comprises a trailer having a roof and walls, and wherein at least one of the roof or one of the walls includes a door or opening, the method further comprising:
automatically opening the door in response to the first drone moving toward the launching area.

17. The method of claim 13, further comprising:
accessing, by a drone control system, flight plans associated with the plurality of drones; and
signaling the at least one robotic element to obtain the first drone based on a scheduled flight.

18. The method of claim 17, further comprising:
identifying, by the drone control system, a payload associated with the scheduled flight; and
signaling the at least one robotic element to pair the identified payload with the first drone.

19. A non-transitory computer-readable medium having stored thereon sequences of instructions which, when executed by at least one processor, cause the at least one processor to:
access flight plans associated with a plurality of drones;
instruct at least one robotic element to move a first one of a plurality of drones from a storage rack based on a scheduled flight identified from the flight plans;
identify a payload for the scheduled flight;
instruct the at least one robotic element to pair the identified payload with the first drone;
instruct, prior to the scheduled flight, the at least one robotic arm to move the first drone to an inspection area comprising at least one camera to determine whether the first drone is approved for the scheduled flight; and
instruct the at least one robotic element to move the first drone to a lift or conveyor for transport to a launching area.

20. The method of claim 13, wherein the at least one camera is configured to provide a 360 degree field of view of the first drone.

* * * * *